US011501766B2

(12) United States Patent
Lee et al.

(10) Patent No.: US 11,501,766 B2
(45) Date of Patent: Nov. 15, 2022

(54) DEVICE AND METHOD FOR PROVIDING RESPONSE MESSAGE TO VOICE INPUT OF USER

(71) Applicant: SAMSUNG ELECTRONICS CO., LTD., Suwon-si (KR)

(72) Inventors: Ga-hee Lee, Seongnam-si (KR); In-dong Lee, Seoul (KR); Se-chun Kang, Incheon (KR); Hyung-rai Oh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2 days.

(21) Appl. No.: 16/342,789

(22) PCT Filed: Nov. 14, 2017

(86) PCT No.: PCT/KR2017/012852
§ 371 (c)(1),
(2) Date: Apr. 17, 2019

(87) PCT Pub. No.: WO2018/093110
PCT Pub. Date: May 24, 2018

(65) Prior Publication Data
US 2020/0058299 A1 Feb. 20, 2020

(30) Foreign Application Priority Data

Nov. 16, 2016 (KR) .................. 10-2016-0152959
Nov. 7, 2017 (KR) .................. 10-2017-0147606

(51) Int. Cl.
*G10L 15/00* (2013.01)
*G10L 15/22* (2006.01)
(Continued)

(52) U.S. Cl.
CPC .............. *G10L 15/22* (2013.01); *G06F 3/167* (2013.01); *G10L 15/1815* (2013.01); *G10L 2015/223* (2013.01)

(58) Field of Classification Search
CPC ......... G10L 15/22; G10L 15/26; G10L 15/07; G10L 15/30; G10L 21/00; G10L 15/06;
(Continued)

(56) References Cited

U.S. PATENT DOCUMENTS 10,210,559 B2 * 2/2019 Stoll .................. G06Q 30/0631
2009/0125813 A1 * 5/2009 Shen ..................... G10L 15/285
715/728

(Continued)

FOREIGN PATENT DOCUMENTS

JP 2001-215128 A 8/2001
JP 2006-184371 A 7/2006
(Continued)

OTHER PUBLICATIONS

A. I. Niculescu, B. Wadhwa and E. Quek, "Technologies for the future: Evaluating a voice enabled smart city parking application," 2016 4th International Conference on User Science and Engineering (i-USEr), 2016, pp. 46-50. (Year: 2016).*

(Continued)

*Primary Examiner* — Edgar X Guerra-Erazo
(74) *Attorney, Agent, or Firm* — Sughrue Mion, PLLC

(57) ABSTRACT

Provided are a device and a method for providing a response message to a voice input of a user. The method, performed by a device, of providing a response message to a voice input of a user includes: receiving the voice input of the user; determining a destination of the user and an intention of the user, by analyzing the received voice input; obtaining association information related to the destination; generating the response message that recommends a substitute destination (Continued)

related to the intention of the user, based on the obtained association information; and displaying the generated response message.

20 Claims, 23 Drawing Sheets

(51) Int. Cl.
*G10L 15/18* (2013.01)
*G06F 3/16* (2006.01)

(58) Field of Classification Search
CPC ............... G10L 15/065; G10L 15/1815; G10L 2015/223; G10L 15/00; G10L 15/063; G10L 2015/228; G10L 2015/221; G10L 15/222; G10L 2015/225; G10L 2015/226; G10L 15/32; G06F 3/167; G06F 3/16; G06F 16/29; G06F 16/3322; G06F 16/3332; G06F 16/94; G06F 16/9535; G06F 16/954; G06F 40/30; G06F 40/284; G06F 40/205; G06F 40/279; G06F 40/289; G06F 40/295; G06F 40/35; G06F 40/268; G06F 40/20; G06F 16/33; G06F 16/337; G06F 16/335; G06F 16/63; G06F 16/24573; G06F 16/245; G06F 16/3344; G01C 21/36; G01C 21/3608; G01C 21/3679; G01C 21/3697; G06Q 30/0261; H04W 4/024; H04W 4/029; G05D 1/0011; G05D 1/0016; G05D 1/0088; G05D 1/021; G05D 1/0217; G05D 1/0274; H04L 67/22; H04L 67/306; H04M 1/72572; H04M 2250/10; G06N 20/00; G06N 7/005; G06N 3/0454; G06N 3/02; G06N 3/08; G06N 20/10
USPC ................. 704/201, 275, E15.045, E15.001, 704/E15.003, E15.04, E15.043, E21.003, 704/235, 257, 260, 270; 455/456.3; 701/1; 707/E17.066, E17.07
See application file for complete search history.

(56) References Cited

U.S. PATENT DOCUMENTS

| 2011/0289503 | A1* | 11/2011 | Toub ..................... G06F 9/4843 |
| | | | 718/102 |
| 2013/0303192 | A1* | 11/2013 | Louboutin ......... G01C 21/3611 |
| | | | 455/456.3 |
| 2014/0006030 | A1 | 1/2014 | Fleizach et al. |
| 2014/0324581 | A1* | 10/2014 | Nordstrom ......... G06Q 30/0256 |
| | | | 705/14.54 |
| 2015/0039292 | A1* | 2/2015 | Suleman ............... G06F 40/216 |
| | | | 704/9 |
| 2015/0088833 | A1 | 3/2015 | Jang et al. |
| 2015/0278916 | A1* | 10/2015 | Stoll .................. G06Q 30/0609 |
| | | | 705/26.7 |
| 2016/0042735 | A1* | 2/2016 | Vibbert ............... G10L 15/1822 |
| | | | 704/257 |
| 2016/0170710 | A1 | 6/2016 | Kim et al. |

FOREIGN PATENT DOCUMENTS

| JP | 2012-32253 A | 2/2012 |
| KR | 10-2014-0085789 A | 7/2014 |
| KR | 10-1488677 B1 | 2/2015 |
| KR | 10-2015-0034896 A | 4/2015 |
| KR | 10-2016-0071732 | 6/2016 |

OTHER PUBLICATIONS

International Search Report (PCT/ISA/210) and Written Opinion (PCT/ISA/237) dated Mar. 5, 2018 issued by the International Searching Authority in International Application No. PCT/KR2017/012852.
Communication dated Mar. 24, 2021 by Intellectual Property India in Indian Patent Application No. 201947015183.
Communication dated Feb. 14, 2022, issued by the Korean Intellectual Property Office in Korean Patent Application No. 10-2017-0147606.
Communication dated Aug. 11, 2022 by the Korean Intellectual Property Office in Korean Patent Application No. 10-2017-0147606.

* cited by examiner

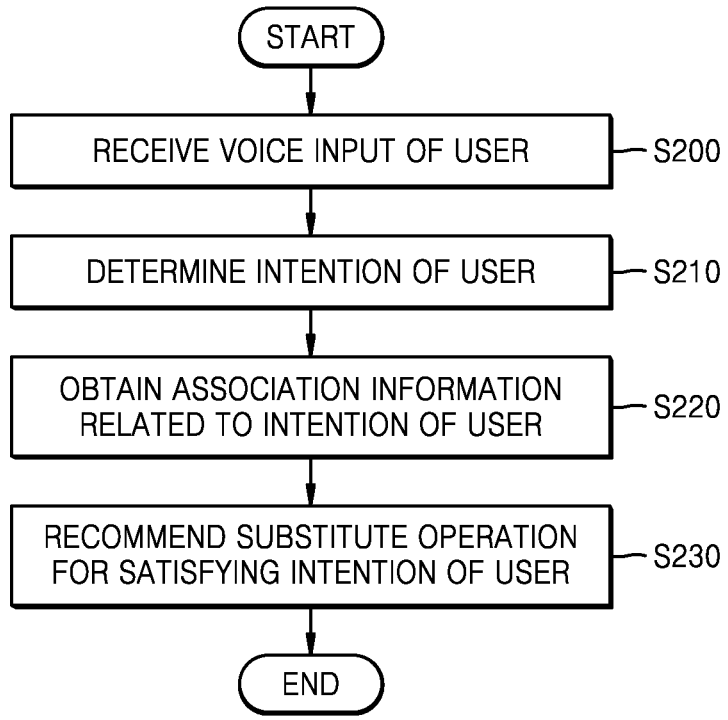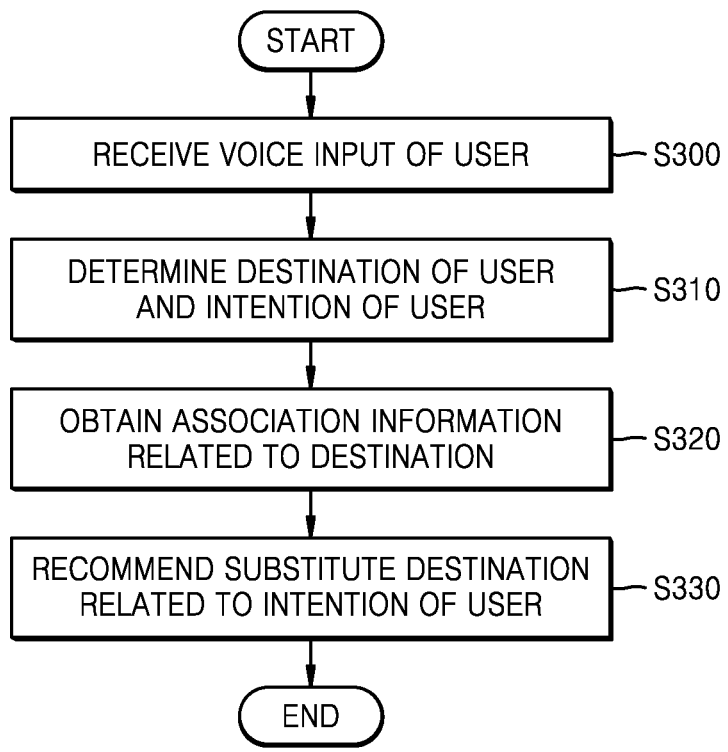

| | Destination | Feasibility | Remark |
|---|---|---|---|
| Original destination | Gangnam A department store | 10% | Closed for business |
| Substitute destination 1 | Dogok B department store | 90% | Open for business |
| Substitute destination 2 | Gangnam C mart | 80% | Open for business |

DEVICE AND METHOD FOR PROVIDING RESPONSE MESSAGE TO VOICE INPUT OF USER

TECHNICAL FIELD

The present disclosure relates to a device and a method for providing a response message to a voice input of a user, and more particularly relates to a device and a method for recommending an operation related to a voice input of a user by using a machine learning algorithm such as deep learning, and an artificial intelligence (AI) system for simulating a function of the human brain such as recognition or decision-making and an application of the AI system.

BACKGROUND ART

With the development of multimedia technology and network technology, users can receive various services by using devices. In particular, with the development of speech recognition technology, users can input voice data to devices and can execute operations of the devices according to voice inputs.

However, it is difficult for existing technology to accurately grasp intentions of users from voice inputs of the users and, even when the intentions of the users are grasped, it is difficult to provide appropriate feedback to the users. Accordingly, there is a demand for technology capable of grasping intentions of users from voice inputs of the users and effectively recommending the users to perform substitute operations for operations requested by the users.

In particular, with the recent development of technology such as artificial intelligence (AI) (e.g., deep learning), intelligent services for automatically recognizing data such as voices, images, videos, or text and providing information related to the data or providing services related to the data are used in various fields.

A AI system is a computer system configured to realize human-level intelligence and get smarter through self-learning and making decisions spontaneously, unlike an existing rule-based smart system. The more an AI system is used, the more its recognition rate improves and the more accurately it understands a user's taste, and thus, the rule-based smart system is gradually being replaced by a deep learning-based AI system.

AI technology includes machine learning (e.g., deep learning) and element technologies that use machine learning.

Machine learning is an algorithm technology that self-classifies and learns characteristics of input data, and element technologies are technologies using a machine learning algorithm such as deep learning to simulate functions of the human brain such as recognition and decision-making, and include technical fields such as linguistic understanding, visual understanding, inference/prediction, knowledge representation, and motion control.

Various fields to which AI technology is applied are as follows. Linguistic understanding is a technology for recognizing and applying/processing human languages/characters and includes natural language processing, machine translation, dialog systems, questions and answering, and speech recognition/synthesis. Visual understanding is a technology for recognizing and processing objects in the manner of a human visual system and includes object recognition, object tracking, image searching, person recognition, scene understanding, spatial understanding, and image enhancement. Inference/prediction is a technology for judging information and logically inferring and predicting the same and includes knowledge/probability-based reasoning, optimization prediction, preference-based planning, and recommendation. Knowledge representation is an automation technology for incorporating human experience information into knowledge data and includes knowledge building (e.g., data generation/classification) and knowledge management (e.g., data utilization). Motion control is a technology for controlling self-driving of autonomous vehicles and the motion of robots and includes movement control (e.g., navigation, collision avoidance, or driving) and manipulation control (e.g., behavior control).

DESCRIPTION OF EMBODIMENTS

Technical Problem

Some embodiments may provide a device and a method for providing a response message to a voice input of a user by using artificial intelligence (AI), which may grasp an intention of the user from the voice input of the user and may recommend a substitute operation for an operation requested by the user.

Also, some embodiments may provide a device and a method for providing a response message to a voice input of a user by using AI, which may grasp an intention of the user from the voice input of the user and may recommend a substitute destination similar to a destination requested by the user.

Also, some embodiments may provide a device and a method for providing a response message to a voice input of a user, which may recommend a substitute operation to the user based on feasibility of an intention of the user grasped from the voice input of the user by using AI.

BRIEF DESCRIPTION OF DRAWINGS

FIG. 2 is a flowchart of a method by which the device 1000 recommends a substitute operation related to an intention of a user, according to some embodiments.

FIG. 3 is a flowchart of a method of recommending a substitute destination related to an intention of a user, according to some embodiments.

BEST MODE

Figure 1:
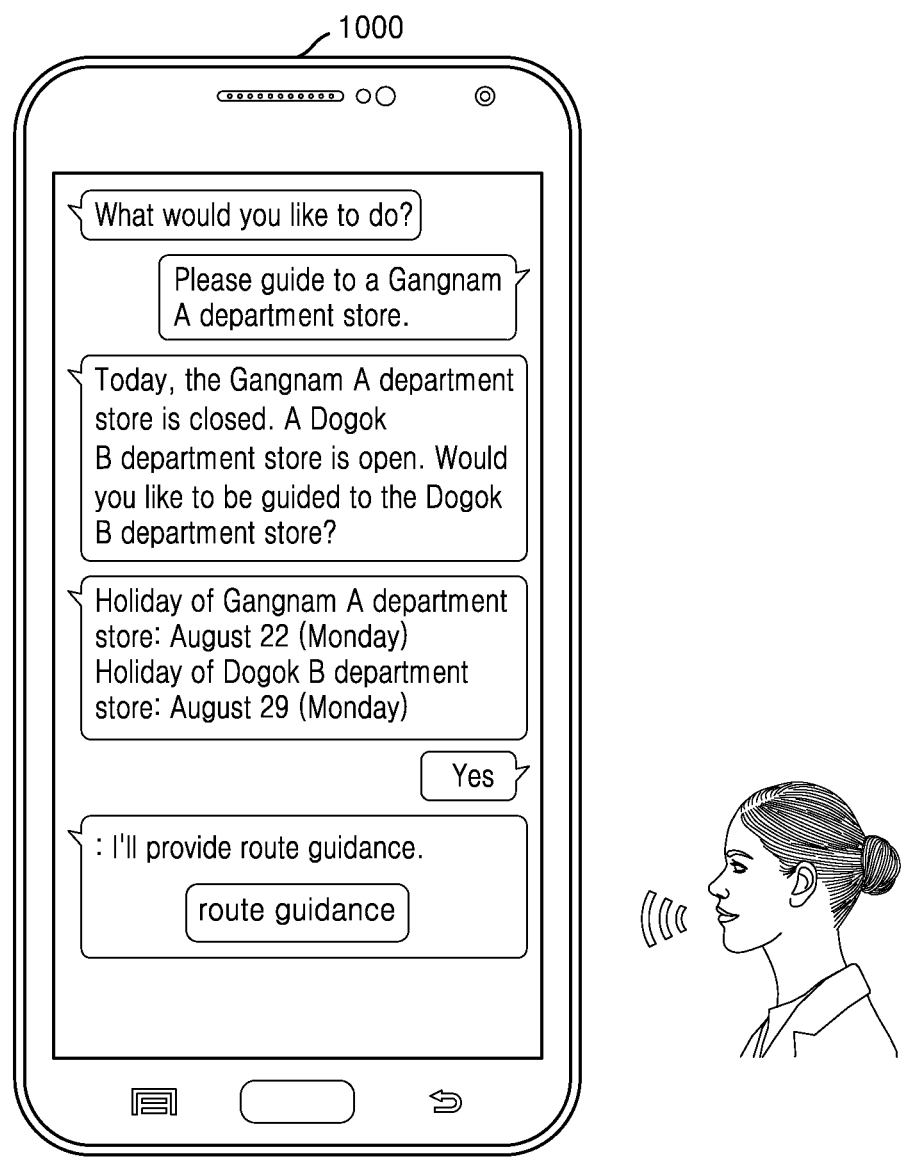
FIG. 1 is a view illustrating an example where a device 1000 provides a response message to a voice input of a user according to some embodiments.

To solve the technical problems, a first aspect of the present disclosure may provide a device include: a memory storing at least one program; a microphone configured to receive a voice input of a user; and at least one processor configured to provide a response message to the voice input of the user by executing the at least one program, wherein the at least one program includes instructions for: determining a destination of the user and an intention of the user, by analyzing the received voice input; obtaining association information related to the destination; generating the response message that recommends a substitute destination related to the intention of the user, based on the obtained association information; and displaying the generated response message.

Also, a second aspect of the present disclosure may provide a method, performed by a device, of providing a response message to a voice input of a user, the method including: receiving the voice input of the user; determining a destination of the user and an intention of the user, by analyzing the received voice input; obtaining association information related to the destination; generating the response message that recommends a substitute destination related to the intention of the user, based on the obtained association information; and displaying the generated response message.

Also, a third aspect of the present disclosure may provide a computer-readable recording medium having embodied thereon a program for executing the method of the second aspect in a computer.

MODE OF DISCLOSURE

The present invention will now be described more fully with reference to the accompanying drawings for one of ordinary skill in the art to be able to perform the present invention without any difficulty. The present invention may, however, be embodied in many different forms and should not be construed as being limited to the embodiments set forth herein. Also, parts in the drawings unrelated to the detailed description are omitted to ensure clarity of the present invention. Like reference numerals in the drawings denote like elements.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

The present invention will now be described more fully with reference to the accompanying drawings.

FIG. 1 is a view illustrating an example where a device 1000 provides a response message to a voice input of a user according to some embodiments.

Referring to FIG. 1, the user may provide a voice input to the device 1000, and the device 1000 may grasp an intention of the user based on the voice input of the user and may provide a response message meeting the intention of the user. The device 1000 may determine whether the intention of the user is feasible, and when it is determined that the intention of the user is hardly feasible, the device 1000 may recommend an operation that may replace the intention of the user.

Also, the device 1000 may grasp the intention of the user by using context information related to the user, for example, context information related to a specific place included in the voice input of the user, and may determine whether the intention of the user is feasible. Also, the device 1000 may recommend the operation that may replace the intention of the user by using the context information related to the user, for example, the context information related to the specific place included in the voice input of the user and may provide additional information related to the intention of the user.

The term 'context information' may include at least one of, but not limited to, ambient environment information of the device 1000, state information of the device 1000, device usage history information of the user, and schedule information of the user. The ambient environment information of the device 1000 that refers to environment information within a predetermined radius from the device 1000 may include, but is not limited to, weather information, temperature information, humidity information, illuminance information, noise information, and sound information. The state information of the device 1000 may include, but is not limited to, information about a mode of the device 1000 (e.g., a sound mode, a vibration mode, a silent mode, a power saving mode, a cutoff mode, a multi-window mode, or an automatic rotation mode), position information of the device 1000, time information, activation information of a communication module (e.g., Wi-Fi ON, Bluetooth OFF, GPS ON, or NFC ON), network connection state information of the device 1000, and information about an application executed by the device 1000 (e.g., application identification information, an application type, an application usage time, or an application usage cycle). The state information of the user that refers to information about the user's movement or life pattern may include, but is not limited to, information about the user's walking state, exercising state, driving state, sleep state, and mood state. The device usage history information of the user that refers to information about events where the user uses the device 1000 may include, but is not limited to, information about execution of applications, functions executed by the applications, phone conversations of the user, and text messages of the user.

Examples of the device 1000 may be, but are not limited to, a smartphone, a tablet personal computer (PC), a PC, a smart television (TV), a mobile phone, a personal digital assistant (PDA), a laptop, a media player, a micro-server, a global positioning system (GPS) device, an electronic book terminal, a digital broadcast terminal, a navigation system, a kiosk, an MP3 player, a digital camera, a home appliance, and any of other mobile or non-mobile computing devices. Also, examples of the device 1000 may include a wearable device such as a watch, glasses, a hair band, or a ring having a communication function and a data processing function. However, the present disclosure is not limited thereto, and the device 1000 may be any type of device that may receive a user input of the user and may provide a response message to the user.

Also, the device 1000 may communicate with a server 2000 and another device (not shown) through a network to use various context information. In this case, examples of the network may include a local area network (LAN), a wide area network (WAN), a value-added network (VAN), a mobile radio communication network, a satellite communication network, and a combination thereof. The network is a data communication network for smooth communication between network components in a broad sense, and examples of the network may include a wired Internet, a wireless Internet, and a mobile wireless communication network. Examples of wireless communication may include, but are not limited to, Wi-Fi, Bluetooth, Bluetooth low energy, Zigbee, Wi-Fi Direct (WFD), ultra-wideband (UWB), infrared data association (IrDA), and near-field communication (NFC).

FIG. 2 is a flowchart of a method by which the device 1000 recommends a substitute operation related to an intention of a user, according to some embodiments.

In operation S200, the device 1000 may receive a voice input of a user. The device 1000 may execute an application that performs an operation of the device 1000 based on the voice input of the user, and may receive the voice input of the user through the executed application. The device 1000 may execute a voice assistant application such as "S voice", and may receive the voice input of the user input through a microphone by controlling the executed voice assistant application.

In operation S210, the device 1000 may determine an intention of the user, based on the voice input of the user. The device 1000 may analyze the voice input of the user by using various natural language analysis methods, and may determine the intention of the user based on meaning of the voice input of the user. Also, the device 1000 may determine the intention of the user by using context information related to the user. For example, the device 1000 may determine the intention of the user, in consideration of events where the user uses the device 1000, schedule information of the user, phone conversations of the user, and text messages of the user. For example, the device 1000 may determine the intention of the user that requests route guidance to a specific place to do shopping at the specific place. Also, for example, the device 1000 may determine the intention of the user that requests the route guidance to the specific place to have a meeting at the specific place. Also, for example, the device 1000 may determine the intention of the user for ordering a particular food. However, the intention of the user determined by the device 1000 is not limited thereto.

When the intention of the user is grasped according to the meaning of the voice input of the user, the context information of the user may be used. Also, which context information is to be used according to the meaning of the voice input may be determined depending on learning according to a preset standard. For example, supervised learning that uses a predetermined voice input and predetermined context information as input values, and unsupervised learning that finds a pattern for grasping the intention of the user by learning a type of the context information needed to grasp the intention of the user by itself without supervision may be used to grasp the intention of the user. Also, for example, reinforcement learning that uses a feedback about whether a result of grasping the intention of the user is right may be used to grasp the intention of the user.

In operation S220, the device 1000 may obtain association information related to the intention of the user. The device 1000 may collect the association information related to the intention of the user to determine whether the intention of the user is feasible. For example, the device 1000 may obtain information about business hours of a specific place, a parking situation of the specific place, available hours of a specific facility, and traffic conditions to the specific place.

Which association information related to the intention of the user is needed may be determined depending on learning according to a preset standard. For example, supervised learning, unsupervised learning, and reinforcement learning may be used to obtain the association information.

In operation S230, the device 1000 may recommend a substitute operation for satisfying the intention of the user. The device 1000 may determine whether the intention of the user is feasible by using the association information, and may recommend the substitute operation for satisfying the intention of the user based on a result of the determination. For example, when the intention of the user that requests route guidance to do shopping at an A department store is hardly feasible, the device 1000 may recommend the user the substitute operation that performs route guidance to a B department store near the A department store.

Which substitute operation is needed to satisfy the intention of the user may be determined depending on learning according to a preset standard. For example, supervised learning, unsupervised learning, and reinforcement learning may be used to determine the substitute operation.

Also, the device 1000 may display a response message that recommends the substitute operation on a screen of the device 1000. Also, the device 1000 may provide an additional operation and additional information related to the intention of the user to the user.

Although each of the grasping of the intention of the user, the obtaining of the association information related to the intention of the user, and the recommending of the substitute operation is performed based on separate learning in the above, the present disclosure is not limited thereto. At least two of the grasping of the intention of the user, the obtaining of the association information related to the intention of the user, and the recommending of the substitute operation may be performed by one learning model.

Also, for example, the grasping of the intention of the user, the obtaining of the association information related to the intention of the user, and the recommending of the substitute operation may be performed based on learning according to deep neural network technology.

In detail, the device 1000 may transmit, to a server through a communicator, a result (e.g., text information) obtained after analyzing the voice input of the user and the context information of the user (e.g., events where the user uses the device 1000, schedule information of the user, phone conversations of the user, and text messages of the user), and the server may grasp the intention of the user, may obtain the association information related to the intention of the user, and may recommend and transmit the substitute operation to the device 1000 by using deep neural network technology.

FIG. 3 is a flowchart of a method of recommending a substitute destination related to an intention of a user according to some embodiments.

In operation S300, the device 1000 may receive a voice input of a user. The device 1000 may execute a voice assistant application such as "S voice", and may receive the voice input of the user through a microphone by controlling the executed application. For example, the device 1000 may receive a user input of the user saying "Please guide to a Gangnam A department store".

In operation S310, the device 1000 may determine a destination of the user and an intention of the user. The device 1000 may determine the destination of the user and the intention of the user based on a learning result according to a preset standard.

The device 1000 may analyze the voice input of the user, by using various natural language analysis methods. For example, the device 1000 may determine that the user requests route guidance to the Gangnam A department store, by analyzing the voice input of the user saying "Please guide to the Gangnam A department store".

Also, the device 1000 may determine the intention of the user by using context information of the user. For example, the device 1000 may determine the intention of the user, in consideration of events where the user uses the device 1000, schedule information of the user, phone conversations of the user, text messages of the user, events where the user visits a specific place, a web search history of the user, and a payment history at the specific place. For example, when a schedule for shopping at a date at which the voice input of the user is input is recorded in the schedule information recorded through a schedule application of the device 1000, the device 1000 may determine that the intention of the user is to request route guidance in order to do shopping at the Gangnam A department store.

When the destination of the user and the intention of the user are grasped according to meaning of the voice input of the user, which context information is to be used may be determined depending on learning according to a preset standard. For example, supervised learning that uses a predetermined voice input and predetermined context information as input values, and unsupervised learning that finds a pattern for grasping the intention of the user by learning a type of the context information needed to grasp the intention of the user by itself without supervision may be used to grasp the intention of the user. Also, for example, reinforcement learning that uses a feedback about whether a result of grasping the intention of the user is right may be used to grasp the intention of the user In operation S320, the device 1000 may obtain association information related to the destination. The device 1000 may obtain the association information related to the destination, in order to determine whether the intention of the user is feasible. For example, when the intention of the user is to request route guidance in order to do shopping at the Gangnam A department store, the device 1000 may obtain information about business hours of the A department store, a parking situation of the A department store, an inventory of the A department store, discount information of the A department store, and traffic conditions to the A department store.

The determining which association information is needed in relation to the intention of the user and the determining of feasibility of the intention of the user may be performed depending on learning according to a preset standard. For example, supervised learning, unsupervised learning, and reinforcement learning may be used to obtain the association information and determine the feasibility of the intention of the user.

In operation S330, the device 1000 may recommend a substitute destination related to the intention of the user. The device 1000 may determine the feasibility of the intention of the user, by using the association information. Also, when the feasibility of the intention of the user is equal to or less than a preset value, the device 1000 may recommend the substitute destination for satisfying the intention of the user. For example, when the Gangnam A department store is closed or does not have an item to be purchased by the user, the device 1000 may recommend a Dogok B department store as the substitute destination. Also, the device 1000 may generate a response message that inquires of the user whether to perform route guidance to the substitute destination and may display the generated response message on a screen of the device 1000.

Which substitute destination is to be determined in order to satisfy the intention of the user may be determined depending on learning according to a preset standard. For example, supervised learning, unsupervised learning, and reinforcement learning may be used to determine the substitute destination.

Although each of the grasping of the destination of the user and the intention of the user, the obtaining of the association information related to the intention of the user, the determining of the feasibility of the intention of the user, and the recommending of the substitute operation is performed based on separate learning in the above, the present disclosure is not limited thereto. At least two of the grasping of the destination of the user and the intention of the user, the obtaining of the association information related to the intention of the user, the determining of the feasibility of the intention of the user, and the recommending of the substitute operation may be performed by one learning model.

Also, for example, the grasping of the destination of the user and the intention of the user, the obtaining of the association information related to the intention of the user, the determining of the feasibility of the user, and the recommending of the substitute operation may be performed based on learning according to deep neural network technology.

In detail, the device 1000 may transmit, to a server through a communicator, a result (e.g., text information) obtained after analyzing the voice input of the user and the context information of the user (e.g., events where the user uses the device 1000, schedule information of the user, phone conversations of the user, and text messages of the user), and the server may grasp the destination of the user and the intention of the user, may determine the feasibility of the intention of the user, and may transmit information about the substitute destination to the device 1000 by using deep neural network technology.

Figure 4:
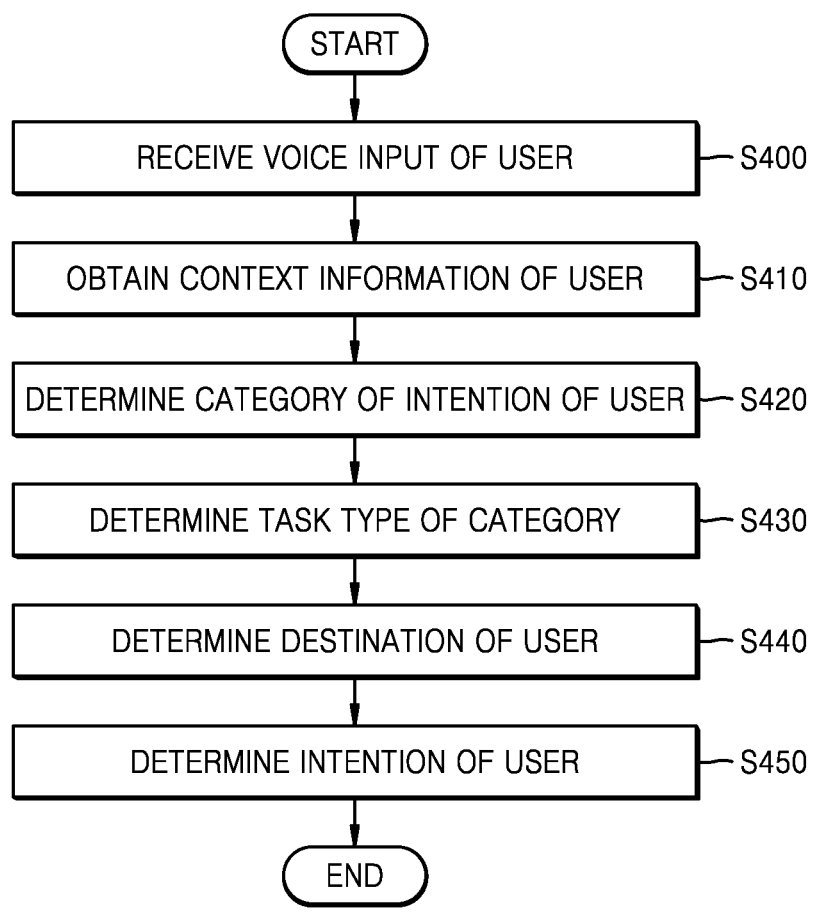
FIG. 4 is a flowchart of a method by which the device 1000 determines an intention of a user, according to some embodiments.

FIG. 4 is a flowchart of a method by which the device 1000 determines an intention of a user according to some embodiments.

In operation S400, the device 1000 may receive a voice input of a user. In operation S410, the device 1000 may obtain context information of the user. The device 1000 may obtain, for example, events where the user uses the device 1000, schedule information of the user, phone conversations of the user, text messages of the user, events where the user visits a specific place, a web search history of the user, and a payment history at the specific place.

In operation S420, the device 1000 may determine a category of an intention of the user. The device 1000 may obtain text by converting the voice input of the user through speech to text (STT). Also, the device 1000 may determine the category of the intention of the user by grasping meaning of the obtained text by using a natural language analysis method. The category of the intention of the user may be classified based on learning according to a preset standard. For example, the device 1000 may determine that the category of the intention of the user is 'route guidance' or 'food order' from input voice of the user. However, a type of the category is not limited thereto. Also, the device 1000 may determine the category of the intention of the user by using the context information of the user.

In operation S430, the device 1000 may determine a task type of the category. The task type of the category may be classified based on learning according to a preset standard, and may indicate a type of a task according to the intention of the user of the category. For example, when the category of the intention of the user is 'route guidance', the task type may be 'shopping' or 'meeting'. However, an example of the task type is not limited thereto. The device 1000 may determine the task type by using the context information of the user and the meaning of the text converted from the input voice of the user. For example, the device 1000 may determine the task type by using the phone conversations, the text messages, or the schedule information of the user. For example, when a memo indicating that the user is to do shopping at a date at which the voice input of the user is received is recorded on a calendar application, the device 1000 may determine that the task type of the user is 'shopping', in consideration of the memo recorded on the calendar application.

In operation S440, the device 1000 may determine a destination of the user. The device 1000 may determine the destination of the user based on the meaning of the text converted from the input voice of the user. For example, the device 1000 may determine that the destination of the user is a 'Gangnam A department store', by analyzing the voice input of the user saying "Please guide to the Gangnam A department store".

In operation S450, the device 1000 may determine the intention of the user. The device 1000 may determine that the user requests route guidance to the Gangnam A department store, based on operations S420 through S440. Also, the device 1000 may determine that the user requests route guidance to the Gangnam A department store in order to purchase an item AA, by considering the context information of the user as well.

Each of the obtaining of the context information, the determining of the category, the determining of the task type, the determining of the destination, and the determining of the intention of the user is performed as a separate operation in the above, the present disclosure is not limited thereto. At least two of the obtaining of the context information, the determining of the category, the determining of the task type, the determining of the destination, and the determining of the intention of the user may be performed based on learning according to a preset standard.

Also, for example, at least two of the obtaining of the context information, the determining of the category, the determining of the task type, the determining of the destination, and the determining of the intention of the user may be performed based on learning according to deep neural network technology.

In detail, the device 1000 may obtain text by converting the voice input of the user through STT. The device 1000 may transmit, to a server through a communicator, the obtained text and the context information of the user (e.g., the events where the user uses the device 1000, the schedule information of the user, the phone conversations of the user, and the text messages of the user), and the server may determine the category of the intention of the user and the task type by applying the text and the context information of the user to a deep neural network and may transmit association information related to the intention of the user to the device 1000.

Figure 5:
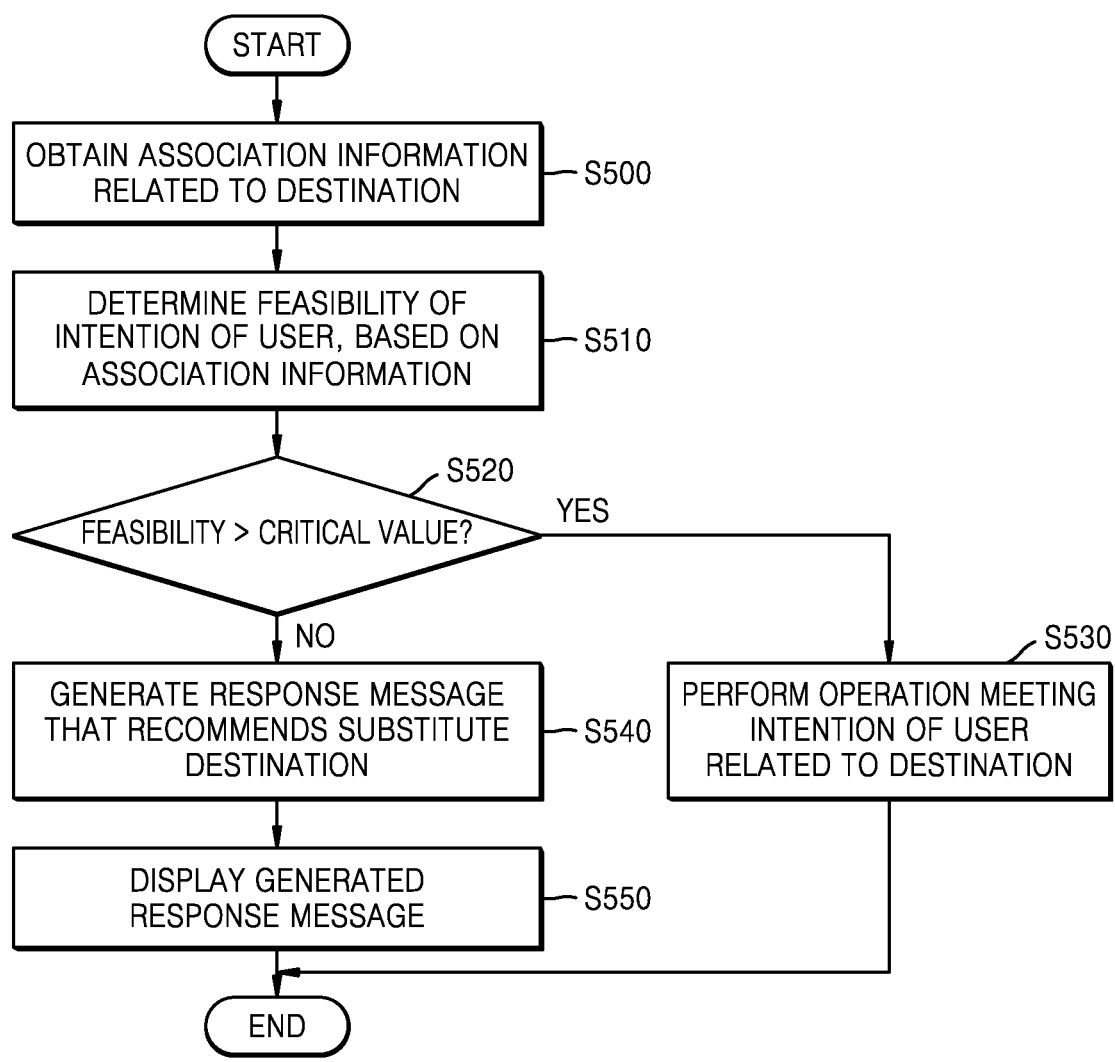
FIG. 5 is a flowchart of a method by which the device 1000 generates a response message for a substitute operation based on feasibility of an intention of a user.

FIG. 5 is a flowchart of a method by which the device 1000 generates a response message for a substitute operation based on feasibility of an intention of a user.

In operation S500, the device 1000 may obtain association information related to a destination. The device 1000 may obtain the association information related to the destination in consideration of an intention of a user. The association information related to the destination that is information needed to determine whether the intention of the user is feasible may be determined based on learning according to a preset standard. For example, when a category of the intention of the user is 'route guidance' and a task type is 'shopping', the device 1000 may obtain business hours of the destination, a parking situation of the destination, and traffic conditions to the destination as the association information related to the destination.

In operation S510, the device 1000 may determine feasibility of the intention of the user, based on the association information. The device 1000 may determine a degree to which the intention of the user is easily feasible, based on the association information. For example, when the intention of the user is to request route guidance to a Gangnam A department store for shopping, the device 1000 may determine the feasibility of the intention of the user, in consideration of whether the Gangnam A department store is open today, whether business hours are over, whether a parking situation of the Gangnam A department store is good, whether traffic conditions to the Gangnam A department store are good, and whether the Gangnam A department store sells an item desired by the user.

In operation S520, the device 1000 may determine whether the feasibility of the intention of the user is greater than a critical value.

When it is determined in operation S520 that the feasibility of the intention of the user is greater than the critical value, in operation S530, the device 1000 may perform an operation meeting the intention of the user related to the destination. For example, the device 1000 may provide information about route guidance to the Gangnam A department store to the user. In this case, the device 1000 may automatically execute a preset navigation application for route guidance, and may input the Gangnam A department store to the executed preset navigation application.

When it is determined in operation S520 that the feasibility of the intention of the user is not greater than the critical value, in operation S540, the device 1000 may generate a response message that recommends a substitute destination. The device 1000 may determine a destination, other than the destination which the user desires to visit, as the substitute destination in order to fulfill the intention of the user. For example, when the Gangnam A department store is closed today, the device 1000 may determine a department store near the user as the substitute destination. Also, for example, when it is difficult to park in the Gangnam A department store, the device 1000 may determine a department store having a good parking situation from among other department stores near the user as the substitute destination. Also, for example, when traffic conditions to the Gangnam A department store are bad, the device 1000 may determine a department store having good traffic conditions from among other department stores near the user as the substitute destination. Also, for example, when the Gangnam A department store does not sell an item desired by the user, the device 1000 may determine a department store that sells the item desired by the user from among other department stores near the user as the substitute destination.

The substitute destination and the destination requested by the user may be of the same type or similar types, and the substitute destination may be searched from among destinations near a current location of the user or the destination requested by the user. Also, the substitute destination may be selected in consideration of the feasibility of the intention of the user.

Also, the device 1000 may generate a response message for inquiring of the user whether to guide to the substitute destination. In this case, the device 1000 may cause text indicating a reason why a substitute operation related to the intention of the user is recommended to be included in the response message. For example, the device 1000 may cause text indicating a reason for guiding to the substitute destination, instead of the destination input by the user, to be included in the response message. The device 1000 may generate the response message saying "Today, the Gangnam A department store is closed. A Dogok B department store is open. Would you like to be guided to the Dogok B department store?". Also, the device 1000 may cause an object for executing an application for performing a specific operation to be included in the response message. For example, the device 1000 may cause an icon for executing a preset navigation application to be included in the response message.

In operation S550, the device 1000 may display the generated response message on a screen of the device 1000. The device 1000 may display the response message in an interactive way on the screen of the device 1000.

Although each of the obtaining of the association information, the determining of the feasibility, the generating of the response message, and the performing of the operation meeting the intention of the user is performed as each operation in the above, at least two of the obtaining of the association information, the determining of the feasibility, the generating of the response message, and the performing of the operation meeting the intention of the user may be performed based on learning according to a preset standard.

Also, for example, at least two of the obtaining of the association information, the determining of the feasibility, the generating of the response message, and the performing of the operation meeting the intention of the user may be performed based on learning according to deep neural network technology.

In detail, the server 2000 may determine information about a category of the intention of the user corresponding to voice input by the user and a task type by using a deep neural network. Also, the server 2000 may train the deep neural network by using the information about the category of the intention of the user and the task type.

Also, the server 2000 may transmit, to the device 1000, the information about the category of the voice input by the user and the task type, and the device 1000 may display the information about the category and the task type on the screen.

Also, the server 2000 may determine whether to obtain the association information related to the voice input by the user, generate the response message by determining the feasibility, and perform the operation meeting the intention of the user by using the deep neural network.

Figure 6:
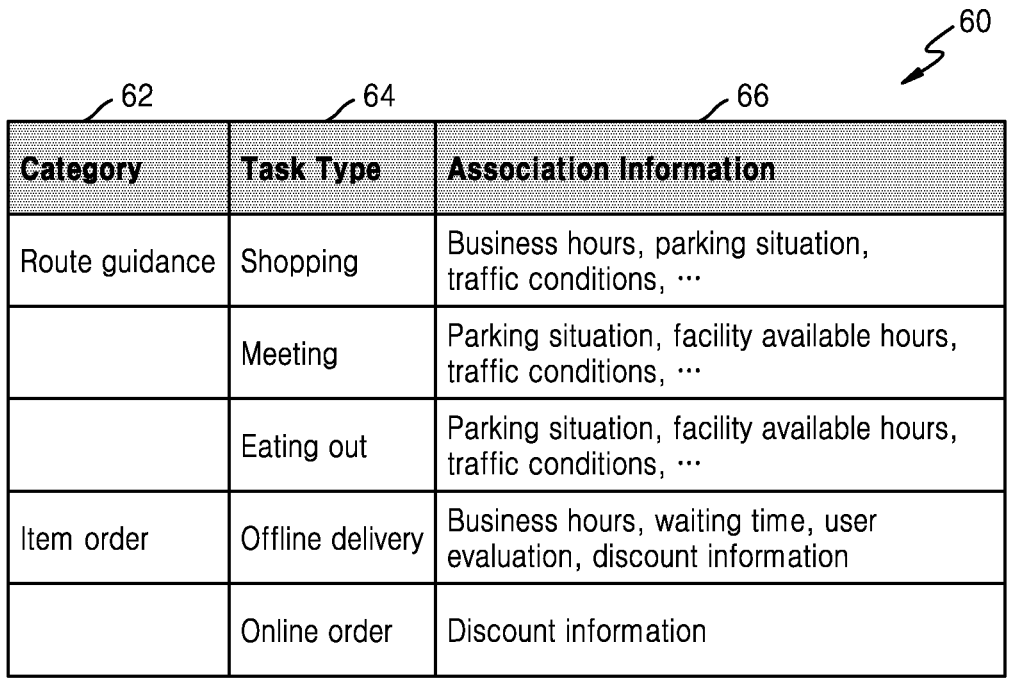
FIG. 6 is a view illustrating a table showing a category of an intention of a user, a task type, and association information related to the intention of the user, according to some embodiments.

FIG. 6 is a view illustrating a table showing a category of an intention of a user, a task type, and association information related to the intention of the user according to some embodiments.

Referring to FIG. 6, a table 60 may include a category field 62, a task type field 64, and an association information field 66.

A category of an intention of a user may be recorded in the category field 62. For example, 'route guidance' and 'item order' may be recorded in the category field 62. The category of the intention of the user may be set and changed based on learning according to a preset standard.

A task type of the category may be recorded in the task type field 64. For example, the task type may include a purpose of the intention of the user or a detailed operation corresponding to a specific category. For example, the task type of the category 'route guidance' may include 'shopping', 'meeting', and 'eating out', and the task type of the category 'item order' may include 'offline delivery' and 'online order'. However, the present disclosure is not limited thereto. The task type related to the intention of the user may be set and changed based on learning according to a preset standard.

Information needed to determine feasibility of the intention of the user may be recorded in the association information field 66. For example, when the category is 'route guidance' and the task type is 'shopping', association information may include business hours, a parking situation, and traffic conditions. Also, for example, when the category is 'item order' and the task type is 'offline delivery', the association information may include business hours, a waiting time, user evaluation, and discount information. The association information needed to determine the feasibility of the intention of the user may be set and changed based on learning according to a preset standard. Also, the association information may be information predicted by using predetermined open data.

The table 60 may be learned and updated through a deep neural network and may be stored in a memory of the server 2000 or a memory of the device 1000.

Figure 7:
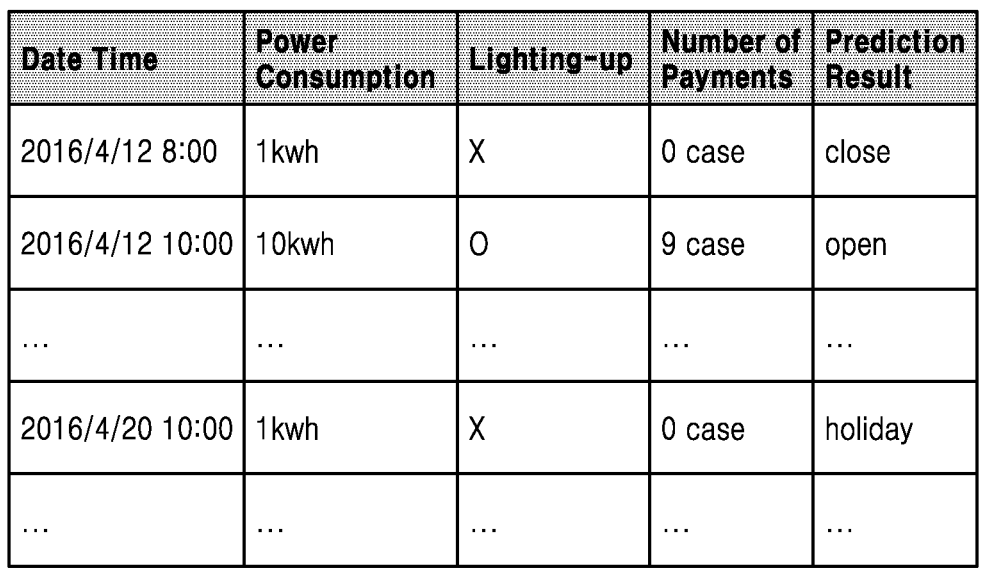
FIG. 7 is a view illustrating a data table 70 used to determine business hours of a specific destination, according to some embodiments.

FIG. 7 is a view illustrating a data table 70 used to determine business hours of a specific destination according to some embodiments.

Referring to FIG. 7, business hours of a specific destination may be predicted by using open data related to the specific destination. For example, data including power consumption of the specific destination, a lighting-up time of the specific destination, and the number of payments at the specific destination may be accumulated and stored by date and time, and the business hours of the specific destination may be predicted by using the accumulated data. Which data is to be used to determine the business hours may be set and changed based on learning according to a preset standard.

The data table 70 may be learned and updated through a deep neural network and may be stored in a memory of the server 2000 or a memory of the device 1000.

Figures 8, 9:
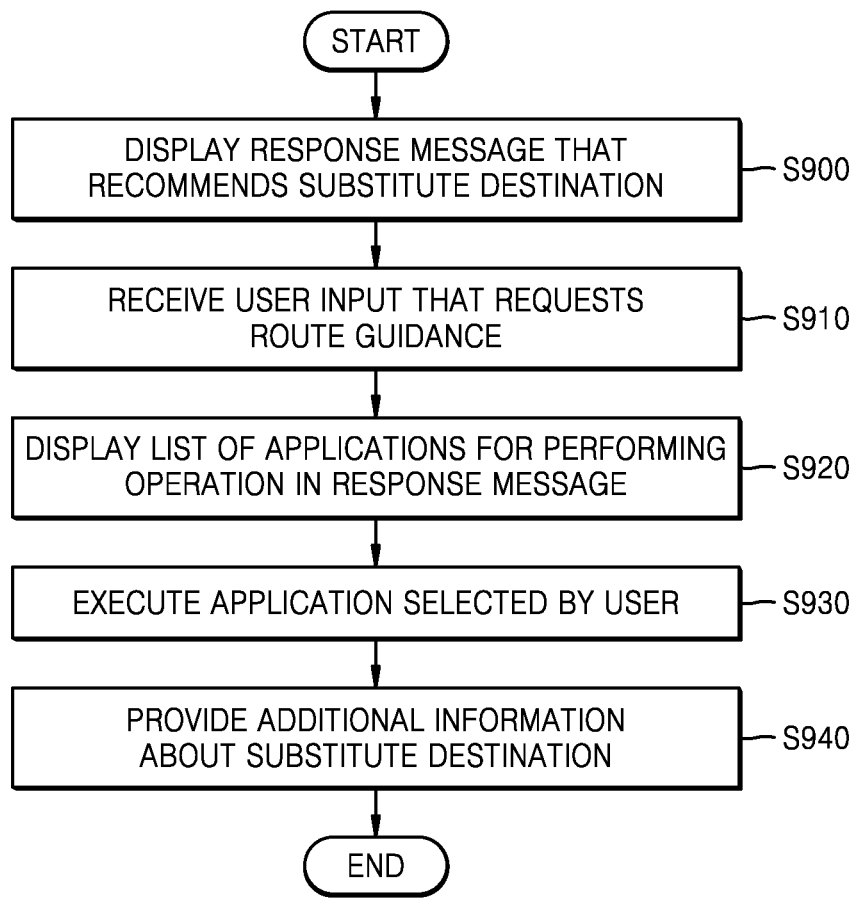
FIG. 8 is a view illustrating a table showing a substitute destination according to feasibility of an intention of a user, according to some embodiments.
FIG. 9 is a flowchart of a method by which the device 1000 executes an application and provides additional information to satisfy an intention of a user, according to some embodiments.

FIG. 8 is a view illustrating a table showing a substitute destination according to feasibility of an intention of a user according to some embodiments.

Referring to FIG. 8, for example, when a user inputs a voice input by saying 'Please guide to a Gangnam A department store', the device 1000 may determine that possibility that the user is able to purchase an item A at the 'Gangnam A department store' that is an original destination according to an intention of the user is 10%. Also, the device 1000 may determine that possibility that the user is able to purchase the item A at a 'Dogok B department store' is 90% and possibility that the user is able to purchase the item A at a 'Gangnam C mart' is 80%. Accordingly, the device 1000 may determine that a substitute destination is the 'Dogok B department store', and may generate a response message that inquires of the user whether to guide to the Dogok B department store.

The substitute destination and the destination requested by the user may be of the same type or similar types, and the substitute destination may be searched from among destinations near a current location of the user or the destination requested by the user. Also, the substitute destination may be selected in consideration of feasibility of the intention of the user.

Although the feasibility of the intention of the user is expressed in % in FIG. 8, the present disclosure is not limited thereto and the feasibility of the intention of the user may be expressed in various units indicating a degree, for example, a score and a level. Also, the feasibility of the intention of the user may be evaluated based on preset learning comprehensively considering various factors such as whether shopping is possible at a specific destination, whether a specific item is available at the specific destination, a price of the specific item, and discount information.

FIG. 9 is a flowchart of a method by which the device 1000 executes an application and provides additional information to satisfy an intention of a user according to some embodiments.

In operation S900, the device 1000 may display a response message that recommends a substitute destination. In operation S910, the device 1000 may receive a user input that requests route guidance to the substitute destination.

In operation S920, the device 1000 may display a list of applications for performing an operation in the response message. For example, when the operation in the response message is 'route guidance to a Dogok B department store', the device 1000 may display a list of navigation applications installed in the device 1000 on a screen of the device 1000.

In operation S930, the device 1000 may execute an application selected by a user. The user may select a specific application in an application list, and the device 1000 may execute the application selected by the user and may input a predetermined input value to the executed application. For example, the device 1000 may input the 'Dogok B department store' as a destination to a navigation application.

In operation S940, the device 1000 may provide additional information about the substitute destination. When the device 1000 arrives at the substitute destination, the device 1000 may provide the additional information about the substitute destination to the user. For example, the device 1000 may display, on the screen of the device 1000, parking information of the substitute destination, a facility use guide, an indoor map of a building, a list of items to be purchased at the substitute destination, discount information, and schedule information of the user related to the substitute destination.

At least one of the displaying of the response message, the generating of the list of the applications for performing the operation in the response message, and the providing of the additional information of the substitute destination may be performed based on learning according to a preset standard. At least one of the displaying of the response message, the generating of the list of the applications for performing the operation in the response message, and the providing of the additional information of the substitute destination may be performed based on learning according to deep neural network technology.

Figure 10:
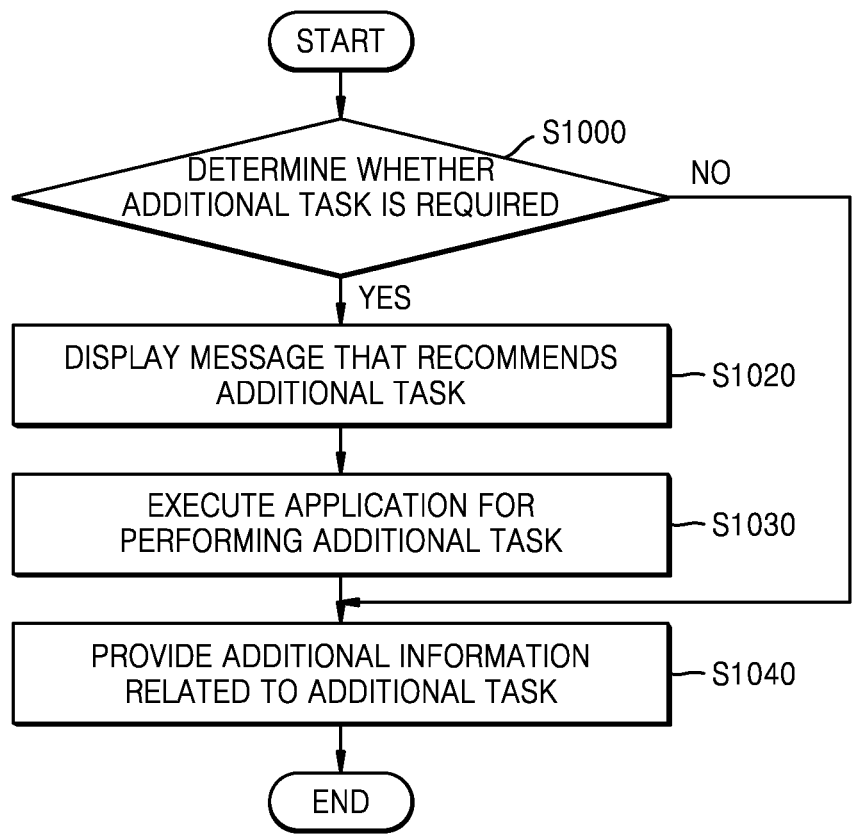
FIG. 10 is a flowchart of a method by which the device 1000 performs an additional task related to an intention of a user, according to some embodiments.

FIG. 10 is a flowchart of a method by which the device 1000 performs an additional task related to an intention of a user according to some embodiments.

In operation S1000, the device 1000 may determine whether an additional task related to an intention of a user is required. The device 1000 may determine whether the additional task related to the intention of the user is required by using meaning of a voice input of the user, a category of the intention of the user, a task type, and context information of the user. For example, when the intention of the user is to request route guidance to a Gangnam A department store in order to purchase an item A at the Gangnam A department store and the device 1000 performs route guidance to a Dogok B department store that is a substitute destination, the device 1000 may determine that the additional task is required in order for the user to easily purchase the item A at the Dogok B department store.

When it is determined in operation S1000 that the additional task is required, in operation S1010, the device 1000 may display a message that recommends the additional task. For example, the device 1000 may display, on a screen of the device 1000, a message that inquires of the user whether to receive location information and coupon information of a store that sells the item A at the Dogok B department store.

Also, the message that recommends the additional task may include an object for executing an application for performing the additional task. For example, the message that inquires of the user whether to receive the location information and the coupon information of the store that sells the item A may include an icon for executing an application that provides the coupon information and the store information of the Dogok B department store.

Also, the device 1000 may confirm that the device 1000 has arrived at the substitute destination, and may display the message that recommends the additional task. When the device 1000 does not recommend the substitute destination, the device 1000 may check whether the user has arrived at a destination requested by the user and may display the message that recommends the additional task.

Also, when a plurality of additional tasks are required, the device 1000 may display a list of the plurality of additional tasks on the screen of the device 1000.

In operation S1030, the device 1000 may execute the application that performs the additional task. For example, when an icon of the application included in the message that recommends the additional task is selected by the user, the device 1000 may execute the application that performs the additional task.

Although the message that recommends the additional task is displayed and the application for performing the additional task is executed according to a user input, the present disclosure is not limited thereto. When it is determined in operation S1000 that the additional task is required, the device 1000 may automatically execute the application that performs the additional task.

In operation S1040, the device 1000 may provide additional information related to the additional task. For example, the device 1000 may provide information such as an in-store map, a schedule of the user, a purchase list of the user, a name of a friend in the destination, and a facility use guide. In this case, the additional information related to the additional task may be set or changed, based on a learning result according to a preset standard.

Operations for recommending the additional task and providing the additional information related to the additional task may be performed based on learning according to a preset standard. For example, the determining whether the additional task is required, the determining of the additional task, and the determining of the additional information related to the additional task may be performed based on learning according to deep neural network technology.

In detail, the device 1000 may transmit voice and the context information of the user to the server 2000, and the server 2000 may determine the meaning of the voice input of the user, the category of the intention of the user, and the task type, may determine whether the additional task related to the intention of the user is required, may determine the additional task, may determine the additional information related to the additional task, and may transmit the determined additional information to the device 1000 by using a deep neural network. The device 1000 may display the message that recommends the additional task on the screen by using the information transmitted from the server 2000. The voice of the user may be analyzed by the device 1000 according to an embodiment.

Figure 11:
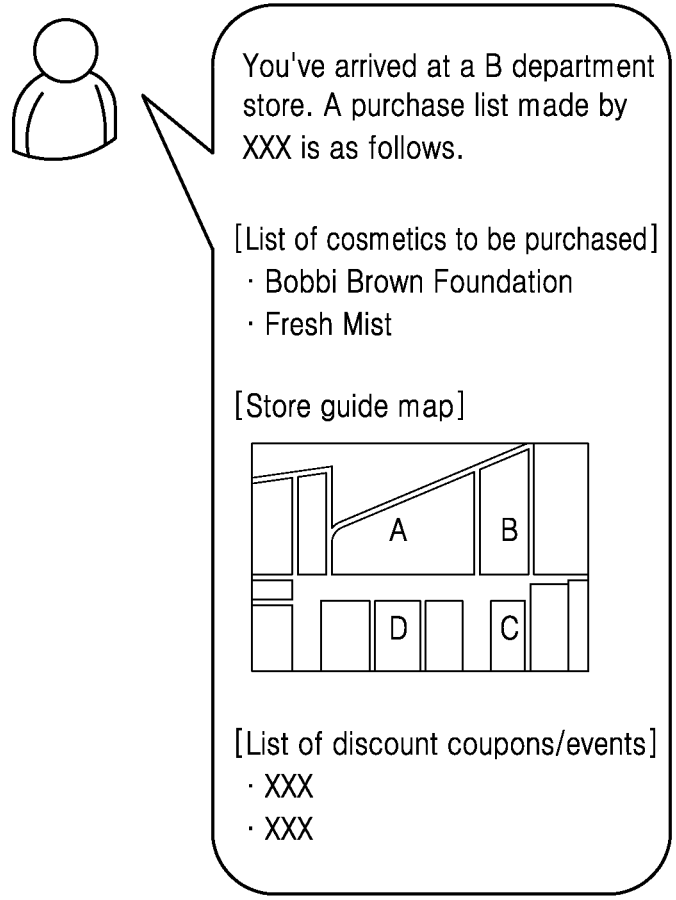
FIG. 11 is a view illustrating an example where the device 1000 provides additional information related to an intention of a user based on a purchase list of the user, according to some embodiments.

FIG. 11 is a view illustrating an example where the device 1000 provides additional information related to an intention of a user based on a purchase list of the user according to some embodiments.

Referring to FIG. 11, the device 1000 may notify that a user has arrived at a B department store that is a destination, and may provide additional information related to shopping of the user. In detail, the device 1000 may provide a purchase list of the user, a map showing a store that sells an item to be purchased, and coupon information related to the item to be purchased.

Figure 12:
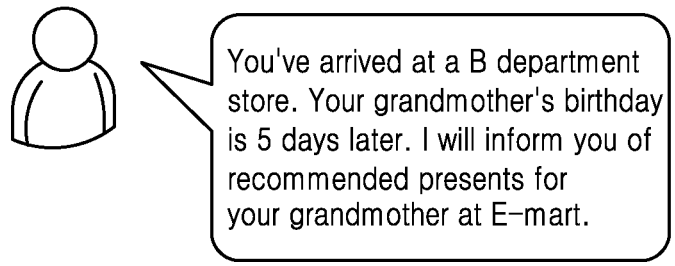
FIG. 12 is a view illustrating an example where the device 1000 provides additional information related to an intention of a user based on schedule information of the user, according to some embodiments.

FIG. 12 is a view illustrating an example where the device 1000 provides additional information related to an intention of a user based on schedule information of the user according to some embodiments.

Referring to FIG. 12, the device 1000 may notify that a user has arrived at a B department store that is a destination, and may recommend items that may be purchased by the user based on a schedule of the user. In detail, the device 1000 may confirm that the user's grandmother's birthday is 5 days later from schedule information of the user, and may display, on a screen of the device 1000, a message for recommending a list of presents for the grandmother.

Figure 13:
FIG. 13 is a view illustrating an example where the device 1000 provides, to a user, information about another user located at a destination, according to some embodiments.

FIG. 13 is a view illustrating an example where the device 1000 provides, to a user, information about another user located at a destination according to some embodiments.

Referring to FIG. 13, the device 1000 may confirm that a user has arrived at a wedding hall to attend a friend's wedding based on schedule information of the user, and may display information about another user who has arrived at the wedding hall on a screen of the device 1000. In this case, the other user who has arrived at the wedding hall may be identified by the device 1000 by using a relationship between the friend to be married and the user and friend information of the user. Also, whether the other user is a friend of the user may be determined by using phone conversations, text messages, and SNS activities of the user.

Figure 14:
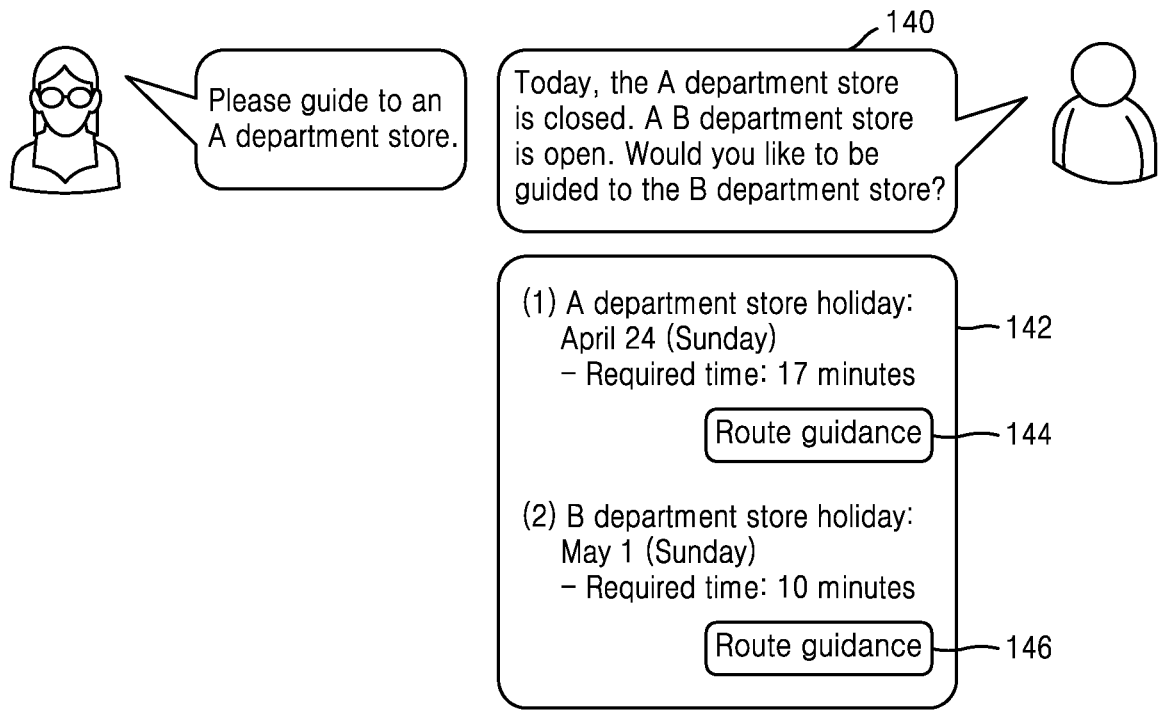
FIG. 14 is a view illustrating an example where the device 1000 recommends a substitute destination in consideration of business days and business hours of a destination, according to some embodiments.

FIG. 14 is a view illustrating an example where the device 1000 recommends a substitute destination in consideration of business days and business hours of a destination according to some embodiments.

Referring to FIG. 14, when a voice input of a user saying 'Please guide to an A department store' is received, the device 1000 may display, on a screen of the device 1000, a message 140 that inquires of the user whether to guide to a B department store that is a substitute destination. In this case, the substitute destination may be determined in consideration of, for example, holidays of the destination, business hours of the destination, and a required time to the destination. Also, for example, the substitute destination may be determined based on a type of the destination, items sold at the destination, and events where the user visits the destination.

Also, the device 1000 may display, on the screen of the device 1000, a message 142 indicating holidays of the A department store, a required time to the A department store, holidays of the B department store, and a required time to the B department store. In this case, the message 142 may include a button 144 for executing a navigation application to guide to the A department store and a button 146 for executing a navigation application to guide to the B department store. When the user selects the button 146, the device

1000 may execute the navigation application and may input the 'B department store' as the destination to the executed navigation application.

Figure 15:
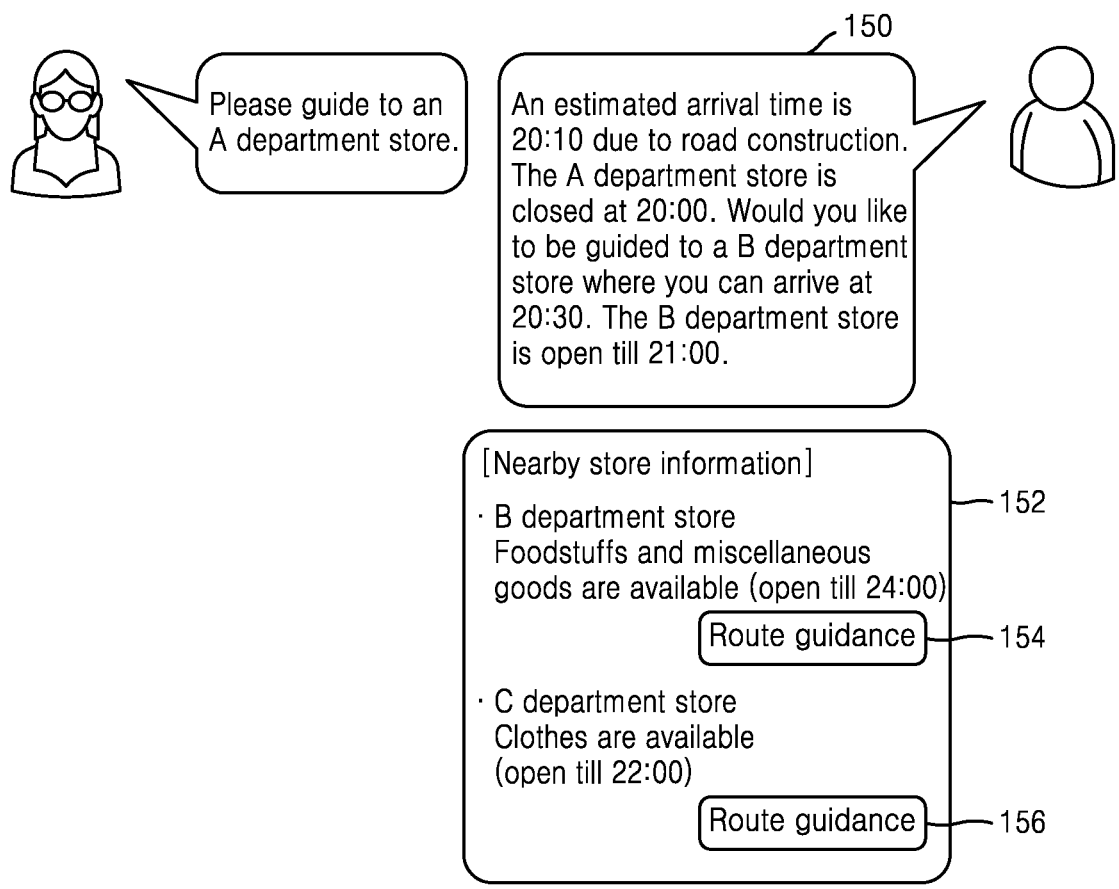
FIG. 15 is a view illustrating an example where the device 1000 recommends a substitute destination in consideration of a required time to reach a destination, according to some embodiments.

FIG. 15 is a view illustrating an example where the device 1000 recommends a substitute destination in consideration of a required time to a destination according to some embodiments.

Referring to FIG. 15, when a voice input of a user saying 'Please guide to an A department store' is received, the device 1000 may display, on a screen of the device 1000, a message 150 that inquires of the user whether to guide to a B department store that is a substitute destination. In this case, the substitute destination may be determined in consideration of, for example, business hours of the destination and a required time to the destination. Also, for example, the substitute destination may be determined based on a type of the destination, items sold at the destination, and events where the user visits the destination.

Also, the device 1000 may display, on the screen of the device 1000, a message 152 indicating business hours of the B department store, information about items that are available at the B department store, business hours of a C department store, and information about items that are available at the C department store. In this case, the message 152 may include a button 154 for executing a navigation application to guide to the B department store and a button 156 for executing a navigation application to guide to the C department store. When the user selects the button 154, the device 1000 may execute the navigation application, and may input the 'B department store' as the destination to the executed navigation application.

Figure 16:
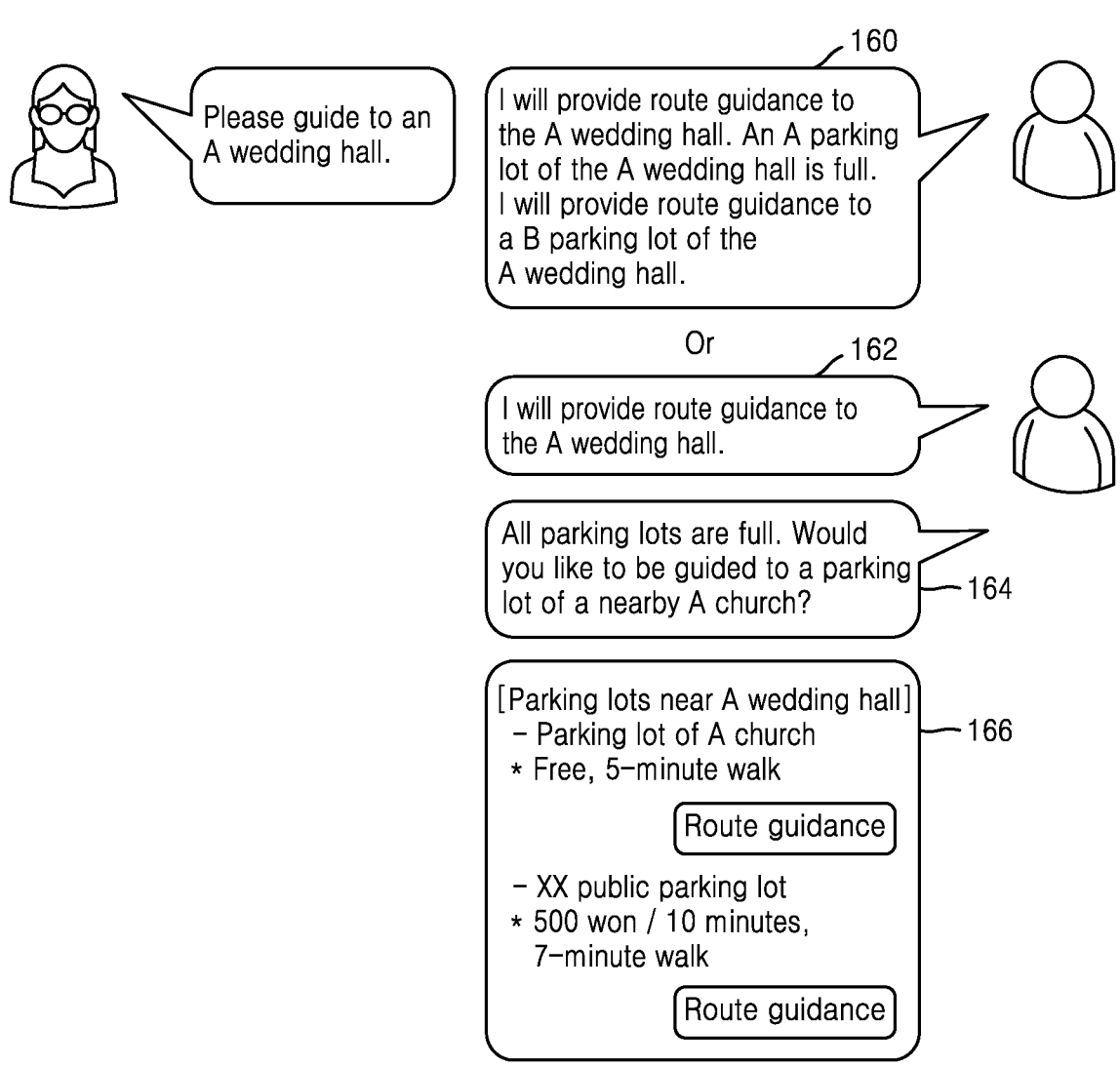
FIG. 16 is a view illustrating an example where the device 1000 provides parking information related to a destination or a substitute destination, according to some embodiments.

FIG. 16 is a view illustrating an example where the device 1000 provides parking information related to a destination or a substitute destination according to some embodiments.

Referring to FIG. 16, when a voice input of a user saying 'Please guide to an A wedding hall' is received, the device 1000 may display, on a screen of the device 1000, a response message 160 for guiding to a substitute destination in consideration of a parking situation of the A wedding hall. The parking situation may include, for example, whether a destination has a parking lot and the number of vehicles that may be parked at the destination. Text indicating a reason for guiding to the substitute destination may be included in the response message 160.

Alternatively, when a voice input of the user saying 'Please guide to the A wedding hall' is received, the device 1000 may display a message 162 that guides to the A wedding hall. After the user arrives at the A wedding hall, the device 1000 may display a message 164 that inquires of the user whether to perform route guidance to the substitute destination in consideration of the parking situation of the A wedding hall. Also, the device 1000 may display a message 166 indicating information about parking lots near the A wedding hall. The device 1000 may display the message 164 and the message 166 while going to the A wedding hall.

Figure 17:
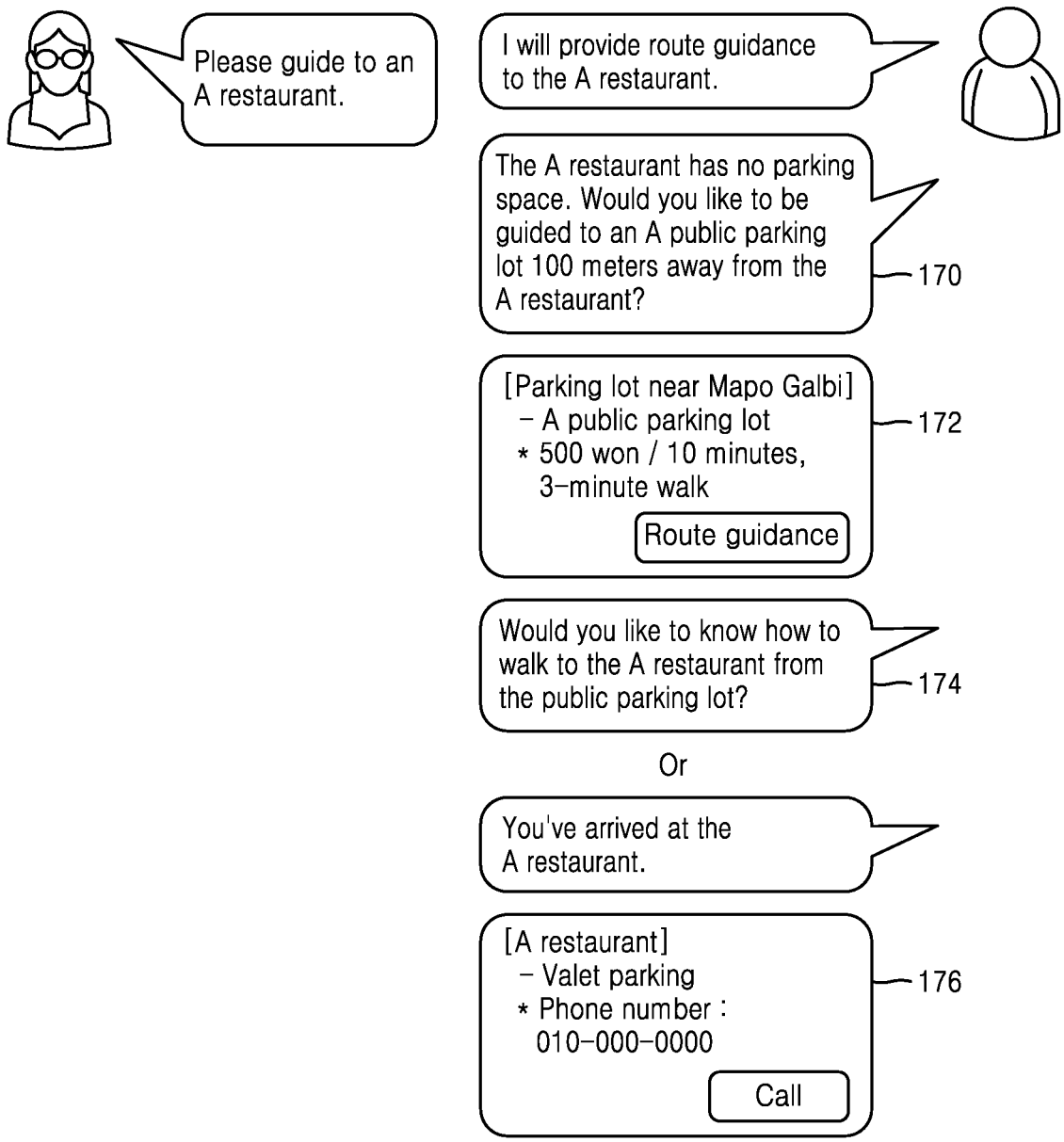
FIG. 17 is a view illustrating an example where the device 1000 recommends parking information and an additional task related to a destination or a substitute destination, according to some embodiments.

FIG. 17 is a view illustrating an example where the device 1000 recommends parking information and an additional task related to a destination or a substitute destination according to some embodiments.

Referring to FIG. 17, when a voice input of a user saying 'Please guide to an A restaurant' is received, the device 1000 may provide route guidance to the A restaurant and may display a message 170 that inquires of the user whether to perform route guidance to an A public parking lot near the A restaurant and a message 172 indicating parking information of the A public parking lot. Also, the device 1000 may display a message 174 for guiding how to walk to the A restaurant from the A public parking lot.

Alternatively, when a voice input of the user saying 'Please guide to the A restaurant' is received, the device 1000 may provide route guidance to the A restaurant. After the user arrives at the A restaurant, the device 1000 may display a message 176 including a button for making a call to the A restaurant to allow the user to park his/her car.

Figure 18:
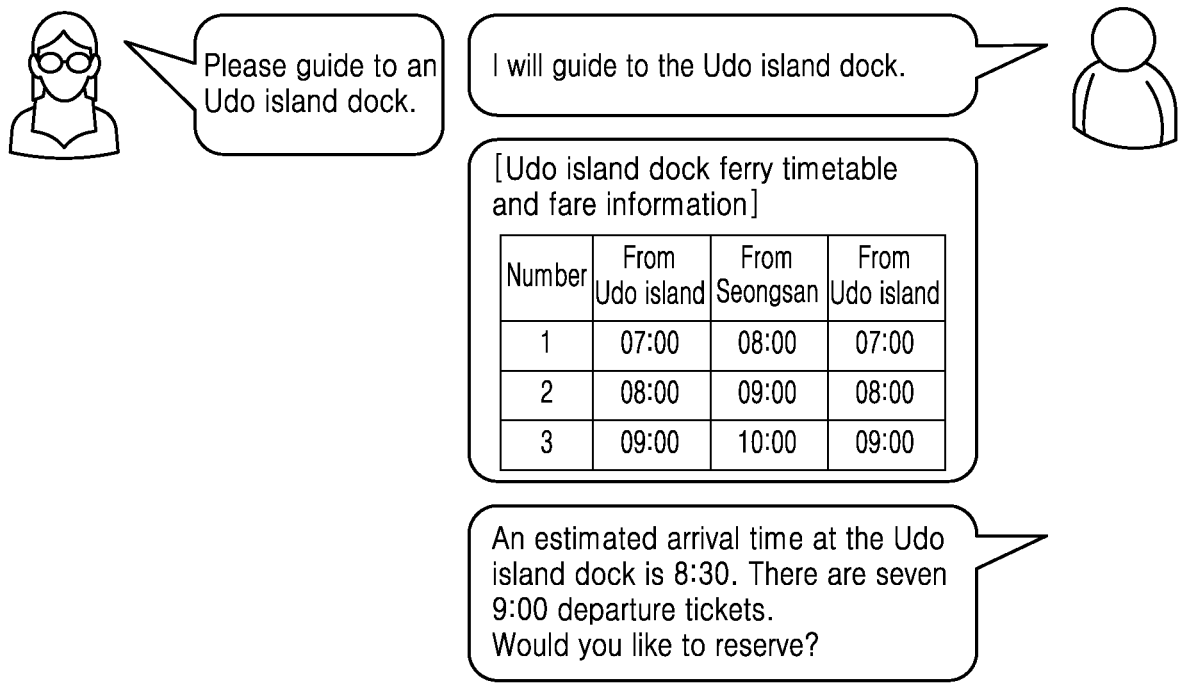
FIG. 18 is a view illustrating an example where the device 1000 provides, as additional information, a timetable of a ferry that departs from a destination, according to some embodiments.

FIG. 18 is a view illustrating an example where the device 1000 provides, as additional information, a timetable of a ferry that departs from a destination according to some embodiments.

Referring to FIG. 18, the device 1000 may provide route guidance to an Udo island dock according to a voice input of a user, and may provide information indicating a ferry timetable and a fare of the Udo island dock to the user. In this case, the device 1000 may determine that an intention of the user that the user is to board a ferry at the Udo island dock, based on the voice input of the user and context information of the user. Also, the device 1000 may recommend the user an additional task of booking a ticket at the Udo island dock.

Figure 19:
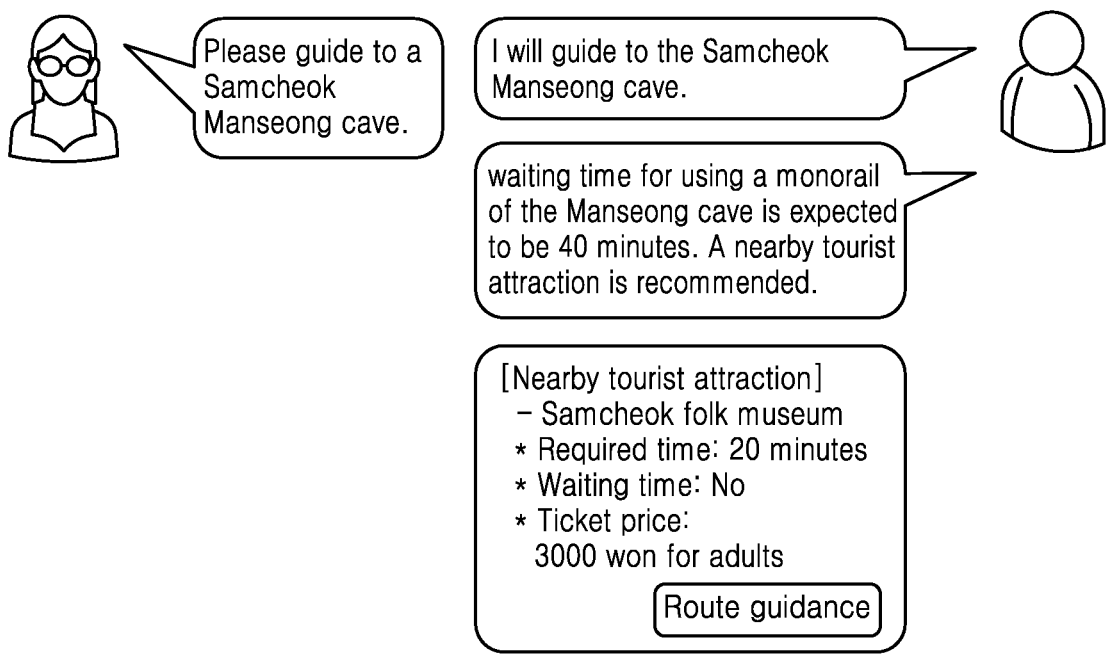
FIG. 19 is a view illustrating an example where the device 1000 recommends a nearby tourist attraction as a substitute destination, based on a waiting time for using a facility of a destination, according to some embodiments.

FIG. 19 is a view illustrating an example where the device 1000 recommends a nearby tourist attraction as a substitute destination, based on a waiting time for using a facility of a destination according to some embodiments.

Referring to FIG. 19, the device 1000 may provide route guidance to a Samcheok Manseong cave according to a voice input of a user and may recommend a nearby tourist attraction as a substitute tourist attraction because a waiting time for using a monorail of the Manseong cave is long. In this case, the device 1000 may determine that an intention of the user is to use the monorail of the Manseong cave, based on the voice input of the user and context information of the user. Also, the device 1000 may provide additional information about the nearby tourist attraction to the user.

Figure 20:
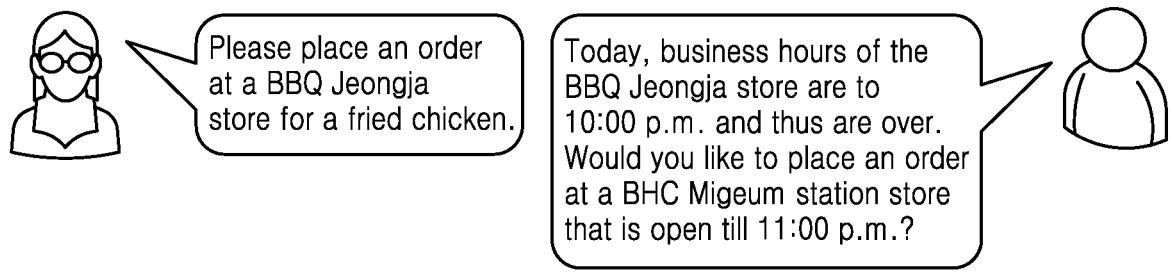
FIG. 20 is a view illustrating an example where the device 1000 provides a response message corresponding to an intention of a user who is to order food, according to some embodiments.

FIG. 20 is a view illustrating an example where the device 1000 provides a response message corresponding to an intention of a user who is to order food according to some embodiments.

Referring to FIG. 20, the device 1000 may receive a voice input of a user saying 'Please place an order at a BBQ Jeongja store for a fried chicken', and may provide, to the user, a response message saying 'Today, business hours of the BBQ Jeongja store are to 10:00 p.m. and thus are over. Would you like to place an order at a BHC Migeum station store that is open till 11:00 p.m.?'. In this case, the device 1000 may determine that a category of an intention of the user is 'food delivery order' and a task type is 'offline order'. Also, the device 1000 may generate a response message for inquiring of the user whether to place an order at a BBQ Migeum station store for a chicken, in consideration of the business hours of the BBQ Jeongja store, a location of the user, business hours of the BBQ Migeum station store, and a location of the BBQ Migeum station store.

Figure 21:
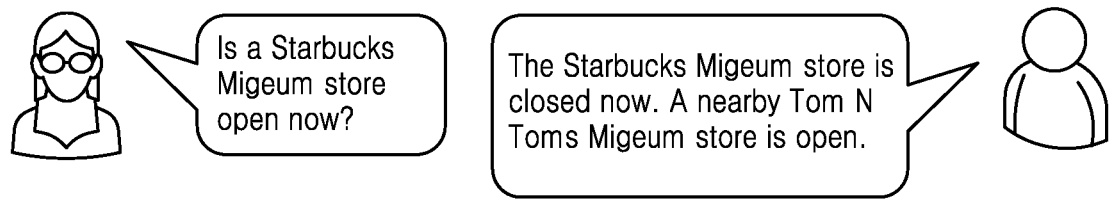
FIG. 21 is a view illustrating an example where the device 1000 provides a response message to an inquiry of a user about a specific place, according to some embodiments.

FIG. 21 is a view illustrating an example where the device 1000 provides a response message to an inquiry of a user about a specific place according to some embodiments.

Referring to FIG. 21, the device 1000 may receive a voice input of a user saying 'Is a Starbucks Migeum store open now?', and may provide, to the user, a response message saying 'The Starbucks Migeum store is closed now. A nearby Tom N Toms Migeum store is open'. In this case, the device 1000 may determine that a category of an intention of the user is 'inquiry' and a task type is 'business hours'. Also, the device 1000 may generate a response corresponding to the voice input of the user, based on business hours of the Starbucks Migeum store, a location of the Starbucks Migeum store, business hours of the Tom N Toms Migeum store, and a location of the Tom N Toms Migeum store.

Figure 22:
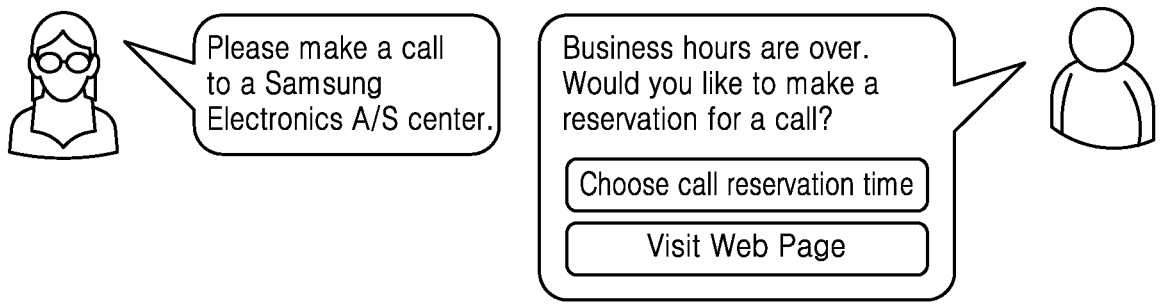
FIG. 22 is a view illustrating an example where the device 1000 provides a response message to a voice input of a user who is to make a call to a specific place, according to some embodiments.

FIG. 22 is a view illustrating an example where the device 1000 provides a response message to a voice input of a user who is to make a call to a specific place according to some embodiments.

Referring to FIG. 22, the device 1000 may receive a voice input of a user saying 'Please make a call to a Samsung Electronics A/S center', and may provide, to the user, a response message saying 'Business hours are over. Would you like to make a reservation for a call?'. In this case, the device 1000 may determine that a category of an intention of the user is 'phone connection' and a task type is 'A/S inquiry'. Also, the device 1000 may generate a response message corresponding to the voice input of the user, in consideration of business hours of the Samsung Electronics A/S center, a call waiting time, and work hours of the user. In this case, information about an additional task for making a reservation for a call and an additional task for accessing a web page may be included in the response message.

Figure 23:
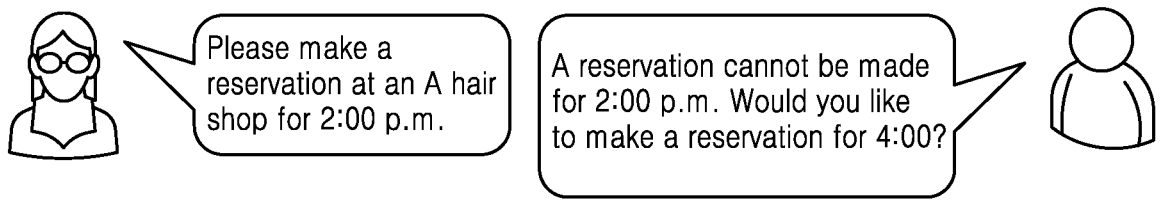
FIG. 23 is a view illustrating an example where the device 1000 provides a response message to a voice input of a user who is to reserve a service of a hair shop, according to some embodiments.

FIG. 23 is a view illustrating an example where the device 1000 provides a response message to a voice input of a user who is to reserve a service of a hair shop according to some embodiments.

Referring to FIG. 23, the device 1000 may receive a voice input of a user saying 'Please make a reservation at an A hair shop for 2:00 p.m.', and may provide, to the user, a response message saying 'A reservation cannot be made for 2:00 p.m. Would you like to make a reservation for 4:00?'. In this case, the user may determine that a category of an intention of the user is 'phone reservation' and a task type is 'haircut'. Also, the device 1000 may generate a response message corresponding to the voice input of the user, in consideration of business days, business hours, and a reservation condition of the A hair shop.

Figure 24:
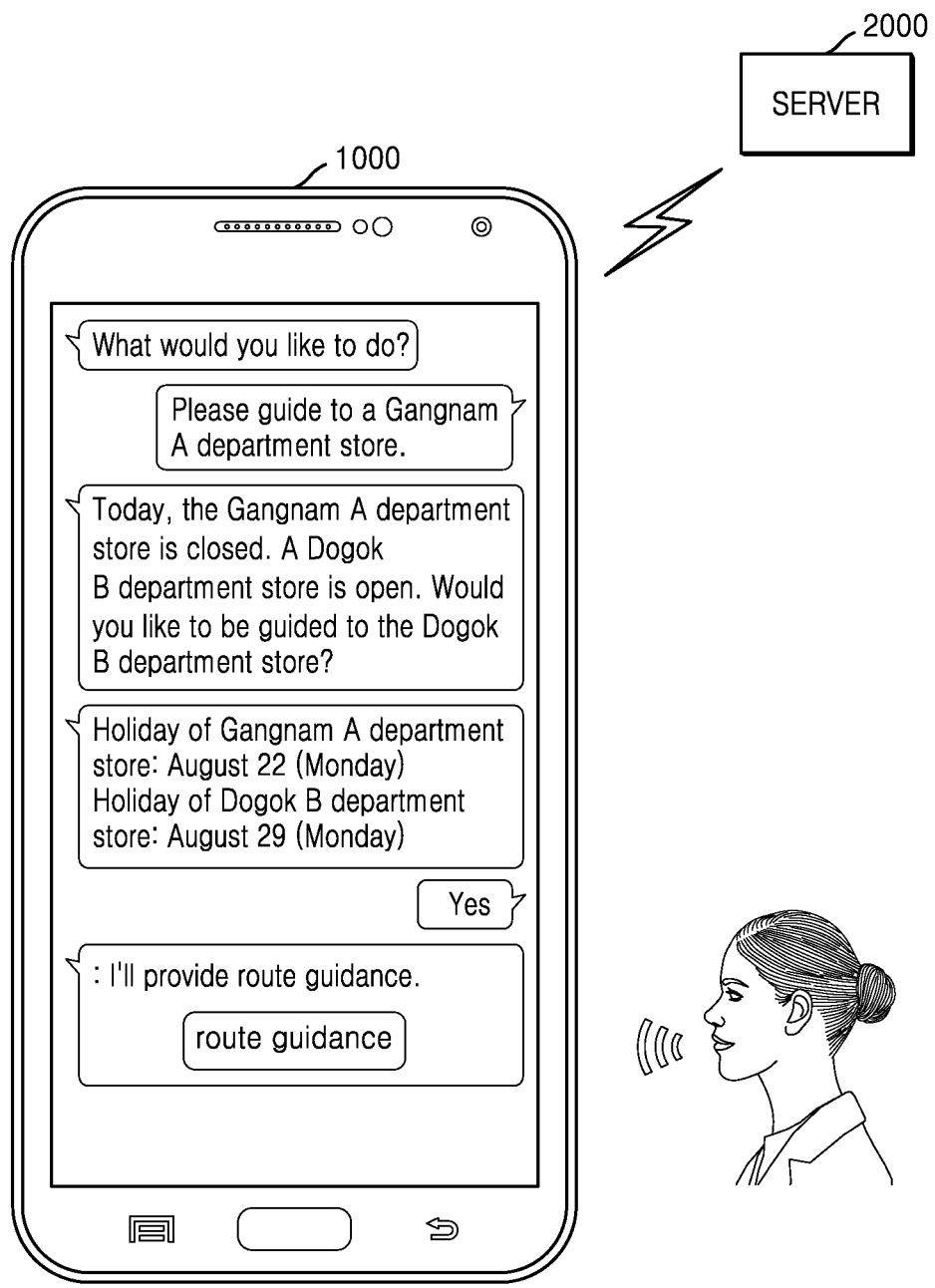
FIG. 24 is a view illustrating an example where the device 1000 provides a response message to a voice input of a user, by interoperating with a server 2000, according to some embodiments.

FIG. 24 is a view illustrating an example where the device 1000 provides a response message to a voice input of a user, by interoperating with the server 2000 according to some embodiments.

Referring to FIG. 24, the device 1000 may be connected through a network to the server 2000, and may provide a response message to a voice input of a user by using data for learning according to a preset standard by the server 2000.

In this case, the server 2000 may perform at least one of a function of determining an intention of the user, a function of obtaining association information related to the intention of the user, a function of recommending a substitute operation for satisfying the intention of the user, a function of recommending an additional task related to the intention of the user, and a function of providing additional information, which are performed by the device 1000 of FIGS. 1 through 23.

In this case, the device 1000 and the server 2000 may transmit/receive necessary data, in order to perform functions thereof. For example, the device 1000 may provide data needed for a predetermined function performed by the server 2000 to the server 2000, and the device 1000 may receive resultant data generated according to the function performed by the server 2000 from the server 2000. Also, the server 2000 may provide data needed for a predetermined function performed by the device 1000 to the device 1000, and the server 2000 may receive resultant data generated according to the function performed by the device 1000 from the device 1000.

Also, the server 2000 may manage at least one of data needed to determine the intention of the user, data needed to obtain the association information related to the intention of the user, data needed to recommend the substitute operation for satisfying the intention of the user, data needed to recommend the additional task related to the intention of the user, and data needed to provide the additional information.

Figure 25:
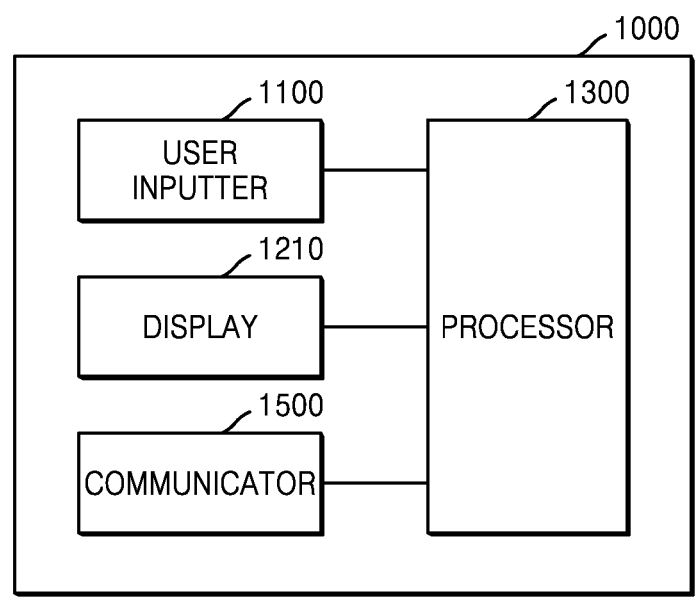
FIGS. 25 and 26 are block diagrams of the device 1000 according to some embodiments.
Figure 26:
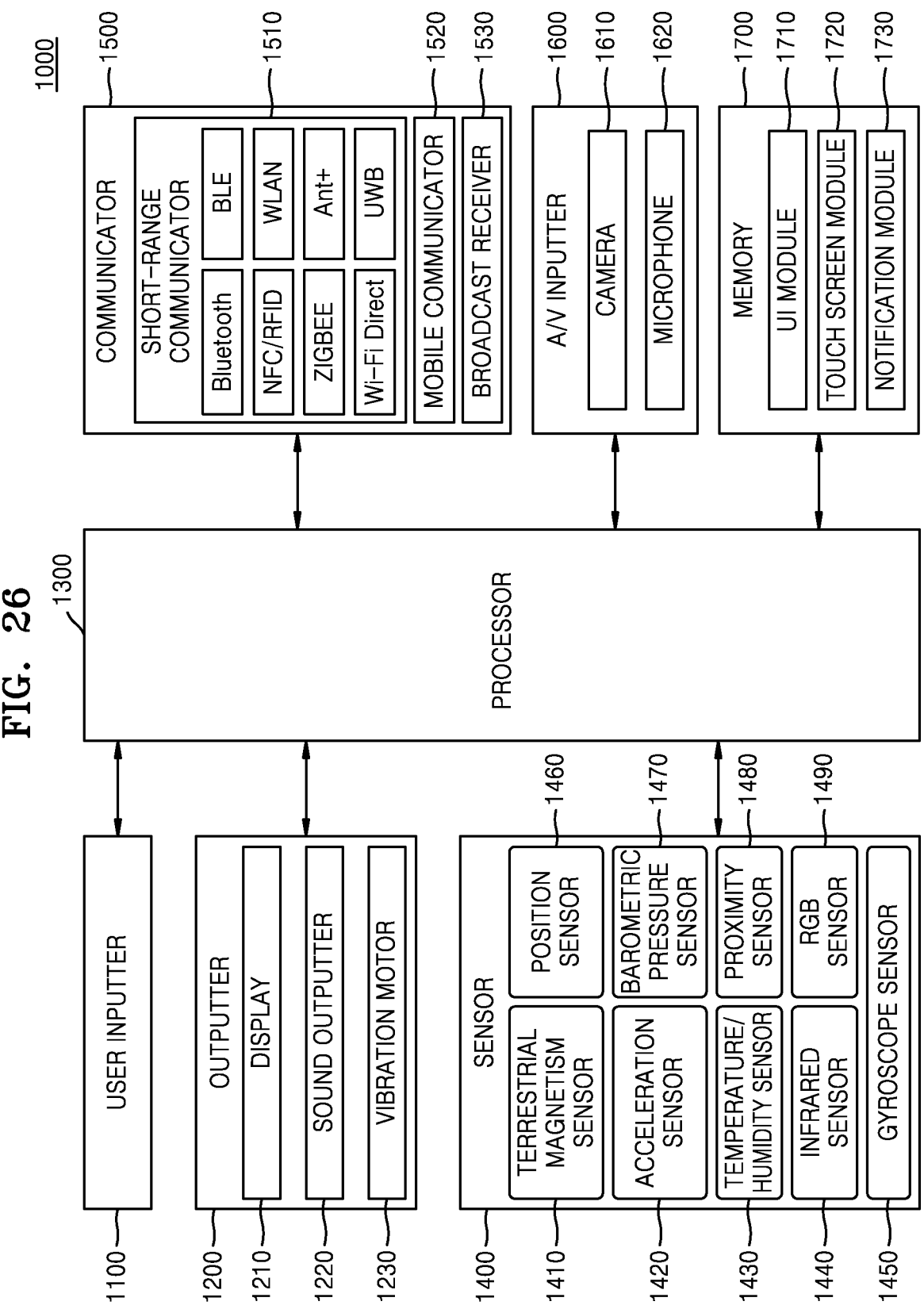

FIGS. 25 and 26 are block diagrams of the device 1000 according to some embodiments.

As shown in FIG. 25, the device 1000 according to some embodiments may include a user inputter 1100, an outputter 1200, a processor 1300, and a communicator 1500. However, all elements illustrated in FIG. 25 are not essential elements of the device 1000. The device 1000 may include elements more or less than the elements illustrated in FIG. 25.

For example, as shown in FIG. 26, the device 1000 according to some embodiments may further include a sensor 1400, an audio/video (A/V) inputter 1600, and a memory 1700 in addition to the user inputter 1100, the outputter 1200, the processor 1300, and the communicator 1500.

The user inputter 1100 is a unit through which a user inputs data for controlling the device 1000. Examples of the user inputter 1100 may include, but are not limited to, a keypad, a dome switch, a touchpad (e.g., a contact-type capacitance method, a pressure-type resistance film method, an infrared sensing method, a surface ultrasound transmission method, an integral tension measuring method, or a piezoelectric effect method), a jog wheel, and a jug switch.

The user inputter 1100 may request a response message to a voice input of the user and may receive a user input for executing an operation related to the response message.

The outputter 1200 may output an audio signal, a video signal, or a vibration signal, and may include a display 1210, a sound outputter 1220, and a vibration motor 1230.

The display 1210 displays and outputs information processed by the device 1000. For example, the display 1210 may display a user interface for requesting a response message to a user input and executing an operation related to the response message.

The sound outputter 1220 outputs audio data received from the communicator 1500 or stored in the memory 1700. Also, the sound outputter 1220 outputs a sound signal (e.g., a call signal receiving sound, a message receiving sound, or a notification sound) related to a function performed by the device 1000.

The processor 1300 generally controls an overall operation of the device 1000. For example, the processor 1300 may control the user inputter 1100, the outputter 1200, the sensor 1400, the communicator 1500, and the A/V inputter 1600 by executing programs stored in the memory 1700. Also, the processor 1300 may perform a function of the device 1000 of FIGS. 1 through 24 by executing programs stored in the memory 1700.

In detail, the processor 1300 may receive a voice input of the user through a microphone 1620. The processor 1300 may execute an application that performs an operation of the device 1000 based on the voice input of the user, and may receive the voice input of the user through the executed application. The processor 1300 may execute a voice assistant application such as "S voice", and may receive the voice input of the user through the microphone 1620 by controlling the executed application.

The processor 1300 may determine an intention of the user, based on the voice input of the user. The processor 1300 may analyze the voice input of the user by using various natural language analysis methods, and may determine the intention of the user based on meaning of the voice input of the user. Also, the processor 1300 may determine the intention of the user by using context information related to the user. For example, the processor 1300 may determine the intention of the user, in consideration of events where the user uses the device 1000, schedule information of the user, phone conversations of the user, and text messages of the user. For example, the processor 1300 may determine the intention of the user that requests route guidance to a specific place to do shopping at the specific place. Also, for example, the processor 1300 may determine the intention of the user that requests the route guidance to the specific place to have a meeting at the specific place. Also, for example, the processor 1300 may determine the intention of the user for ordering particular food. However, the intention of the user determined by the processor 1300 is not limited thereto.

The processor 1300 may obtain association information related to the intention of the user. The processor 1300 may collect the association information related to the intention of the user to determine whether the intention of the user is feasible. For example, the processor 1300 may obtain information about business hours of the specific place, a parking situation of the specific place, available hours of a specific facility, and traffic conditions to the specific place.

The processor 1300 may recommend a substitute operation for satisfying the intention of the user. The processor 1300 may determine whether the intention of the user is feasible by using the association information, and may recommend the substitute operation for satisfying the intention of the user based on a result of the determination. For example, when the intention of the user that requests route guidance to do shopping at an A department store is hardly feasible, the processor 1300 may recommend the user the substitute operation that performs route guidance to a B department store near the A department store.

Also, the processor 1300 may display a response message that recommends the substitute operation on the display 13210. Also, the processor 1300 may provide an additional operation and additional information related to the intention of the user to the user.

The processor 1300 may recommend a substitute destination related to the intention of the user. In this case, the processor 1300 may determine a destination of the user and the intention of the user. The processor 1300 may analyze the voice input of the user, by using various natural language analysis methods. For example, the processor 1300 may determine that the user requests route guidance to a Gangnam A department store, by analyzing the voice input of the user saying "Please guide to the Gangnam A department store".

Also, the processor 1300 may determine the intention of the user by using the context information of the user. For example, the processor 1300 may determine the intention of the user, in consideration of, for example, events where the user uses the device 1000, schedule information of the user, phone conversations of the user, text messages of the user, events where the user visits the specific place, a web search history of the user, and a payment history at the specific place. For example, when a schedule for do shopping at a date at which the voice input of the user is input is recorded in the schedule information recorded through a schedule application of the device 1000, the processor 1300 may determine that the intention of the user is to request route guidance in order to do shopping at the Gangnam A department store.

The processor 1300 may obtain association information related to the destination. The processor 1300 may obtain the association information related to the destination, in order to determine whether the intention of the user is feasible. For example, when the intention of the user is to request route guidance in order to do shopping at the Gangnam A department store, the processor 1300 may obtain information about business hours of the A department store, a parking situation of the A department store, an inventory of the A department store, discount information of the A department store, and traffic conditions to the A department store.

The processor 1300 may recommend the substitute destination related to the intention of the user. The processor 1300 may determine feasibility of the intention of the user, by using the association information. Also, when the feasibility of the intention of the user is equal to or less than a preset value, the processor 1300 may recommend the substitute destination for satisfying the intention of the user. For example, when the Gangnam A department store is closed or does not have an item to be purchased by the user, the processor 1300 may recommend a Dogok department store as the substitute destination. Also, the processor 1300 may generate a response message that inquires of the user whether to perform route guidance to the substitute destination, and may display the generated response message on the display 1210.

Also, the processor 1300 may recommend an additional task related to the intention of the user, and may provide additional information related to the intention of the user to the user.

Also, the processor 1300 may determine the intention of the user by using a data recognition model stored in the memory 1700 or the server 2000, may provide the association information, and may recommend the substitute operation, as described below in detail with reference to FIGS. 28 through 31.

Also, the processor 1300 may efficiently learn a standard for determining the intention of the user, providing the association information, and recommending the substitute operation by using the data recognition model stored in the memory 1700 or the server 2000, and may provide a service meeting the intention of the user to the user according to a learning result.

The sensor 1400 may detect a state of the device 1000 or a state around the device 1000, and may transmit information about the state to the processor 1300. The sensor 1400 may be used to generate part of context information indicating an ambient condition of the user or the device 1000.

The sensor 1400 may include at least one from among, but not limited to, a terrestrial magnetism sensor 1410, an acceleration sensor 1420, a temperature/humidity sensor 1430, an infrared sensor 1440, a gyroscope sensor 1450, a position sensor (e.g., a GPS) 1460, a barometric pressure sensor 1470, a proximity sensor 1480, and an RGB sensor (e.g., an illuminance sensor) 1490. Functions of the sensors would have been intuitively derived by one of ordinary skill in the art from their names, and thus a detailed explanation thereof will not be given.

The communicator 1500 may include one or more elements through which the device 1000 communicates with another device (not shown) and the server 2000. The other device (not shown) may be, but is not limited to, a computing device or a sensing device, like the device 1000. For example, the communicator 1500 may include a short-range communicator 1510, a mobile communicator 1520, and a broadcast receiver 1530.

Examples of the short-range communicator 1510 may include, but are not limited to, a Bluetooth communicator, a Bluetooth low energy (BLE) communicator, a near-field communicator, a WLAN (Wi-Fi) communicator, a Zigbee communicator, an infrared data association (IrDA) communicator, a Wi-Fi Direct (WFD) communicator, an ultra-wideband (UWB) communicator, and an Ant+ communicator.

The mobile communicator 1520 transmits/receives a wireless signal to/from at least one of a base station, an external terminal, and a server via a mobile communication network. Examples of the wireless signal may include a voice call signal, a video call signal, and any of various pieces of data according to text/multimedia message transmission/reception.

The broadcast receiver 1530 receives a broadcast signal and/or broadcast-related information from the outside through a broadcast channel. Examples of the broadcast channel may include a satellite channel and a terrestrial channel. According to an embodiment, the device 1000 may not include the broadcast receiver 1530.

Also, the communicator 1500 may transmit/receive information needed to request a response message to the voice input of the user and execute an operation related to the response message to/from the server 2000 and the other device (not shown).

The A/V inputter 1600 for receiving an audio signal input or a video signal input may include a camera 1610 and the microphone 1620. The camera 1610 may obtain image frames such as a still image or a moving image by using an image sensor in a video call mode or an imaging mode. An image captured through the image sensor may be processed by the processor 1300 or an additional image processor (not shown). An image captured by the camera 1610 may be used as context information of the user.

The microphone 1620 receives an external sound signal and processes the external sound signal into electrical voice data. For example, the microphone 1620 may receive a sound signal from an external device or the user. The microphone 1620 may receive the voice input of the user. The microphone 1620 may use any of various noise removing algorithms to remove noise occurring when receiving the external sound signal.

The memory 1700 may store a program for processing and controlling the processor 1300, and may store data input to the device 1000 or output from the device 1000.

The memory 1700 may include at least one type of storage medium from among a flash memory type, a hard disk type, a multimedia card micro type, a card-type memory (e.g., an SD or XD memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

Programs stored in the memory 1700 may be classified into a plurality of modules according to functions of the memory 1700. For example, the memory 1700 may include a user interface (UI) module 1710, a touchscreen module 1720, and a notification module 1730.

The UI module 1710 may provide a specialized UI or a graphical user interface (GUI) that interoperates with the device 1000 according to an application. The touchscreen module 1720 may detect a touch gesture on a touchscreen of the user, and may transmit information about the touch gesture to the processor 1300. The touchscreen module 1720 according to some embodiments may recognize and analyze a touch code. The touchscreen module 1720 may be configured as separate hardware including a controller.

The notification module 1730 may generate a signal for notifying an event occurring in the device 1000. Examples of the event occurring in the device 1000 may include call signal reception, message reception, key signal input, and schedule notification. The notification module 1730 may output a notification signal as a video signal through the display 1210, may output a notification signal as an audio signal through the sound outputter 1220, or may output a notification signal as a vibration signal through the vibration motor 1230.

Figure 27:
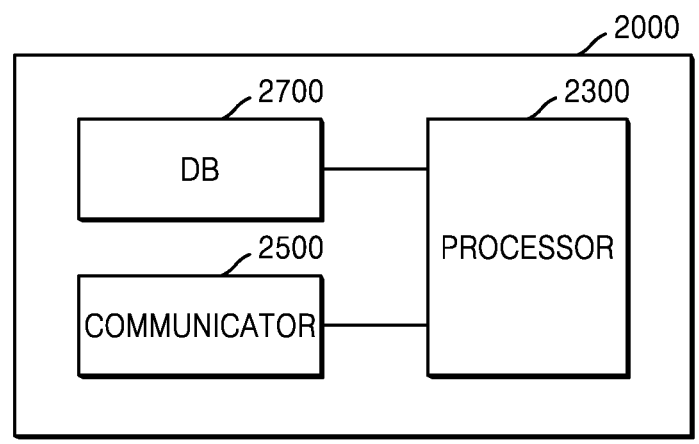
FIG. 27 is a block diagram of the server 2000 according to some embodiments.

FIG. 27 is a block diagram of the server 2000 according to some embodiments.

Referring to FIG. 27, the server 2000 according to some embodiments may include a communicator 2500, a DB 2700, and a processor 2300.

The communicator 2500 may include one or more elements through which the server 2000 communicates with another device (not shown) and the device 1000.

The DB 2700 may store data for authenticating vehicle plate number-based payment.

The processor 2300 generally controls an overall operation of the server 2000. For example, the processor 2300 may control the DB 2700 and the communicator 2500 by executing programs stored in the DB 2700 of the server 2000. The processor 2300 may perform some operations of the device 1000 of FIGS. 1 through 23 by executing programs stored in the DB 2700.

The processor 2300 may perform at least one of a function of determining an intention of a user, a function of obtaining association information related to the intention of the user, a function of recommending a substitute operation for satisfying the intention of the user, a function of recommending an additional task related to the intention of the user, and a function of providing additional information, which are performed by the device 1000 of FIGS. 1 through 23.

Also, the processor 2300 may manage at least one of data needed to determine the intention of the user, data needed to obtain the association information related to the intention of the user, data needed to recommend the substitute operation for satisfying the intention of the user, data needed to recommend the additional task related to the intention of the user, and data needed to provide the additional information.

Figure 28:
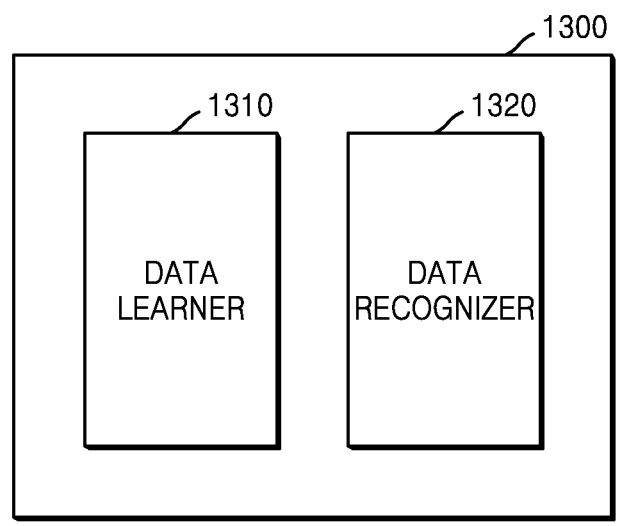
FIG. 28 is a block diagram of a processor 1300 according to some embodiments.

FIG. 28 is a block diagram of the processor 1300 according to some embodiments.

Referring to FIG. 28, the processor 1300 according to some embodiments may include a data learner 1310 and a data recognizer 1320. The processor 1300 may be included in the device 1000 or the server 2000.

According to an embodiment, at least a part of the data learner 1310 and at least a part of the data recognizer 1320 may be implemented as a software module or manufactured as a hardware chip and may be mounted on the device 1000 or the server 2000.

The data learner 1310 may learn a standard for determining an intention of a user, providing association information related to the intention of the user, and recommending a substitute operation for satisfying the intention of the user. The data learner 1310 may learn a standard for determining the intention of the user, providing the association information, and determining which data is to be used to recommend the substitute operation. Also, the data learner 1310 may learn a standard about how to determine the intention of the user by using data, how to obtain and provide the association information, and how to determine the substitute operation. The data learner 1310 may learn a standard for determining the intention of the user, providing the association information, and recommending the substitute operation by obtaining data to be used for learning and applying the obtained data to a data recognition model as described below.

Voice data and text data may be included in a type of training data input to the data learner 1310.

The data recognizer 1320 may determine the intention of the user based on data, may determine the association information, and may recommend the substitute operation. The data recognizer 1320 may determine the intention of the user from predetermined data, may determine the association information, and may recommend the substitute operation by using a trained data recognition model. The data recognizer 1320 may obtain the predetermined data according to a standard that is pre-set by learning, and may use the data recognition model by using the obtained predetermined data as an input value. Also, the data recognizer 1320 may determine the intention of the user, the association information, and the substitute operation based on the predetermined data, by using the data recognition model. Also, a result value output by the data recognition model by using the obtained predetermined data as an input value may be used to refine the data recognition model.

At least one of the data learner 1310 and the data recognizer 1320 may be manufactured as at least one hardware chip and may be mounted on the device 1000. For example, at least one of the data learner 1310 and the data recognizer 1320 may be manufactured as a dedicated hardware chip for artificial intelligence (AI), or may be manufactured as a part of an existing general-purpose processor (e.g., a central processing unit (CPU) or an application processor) or a graphics processor (e.g., a graphics processing unit (GPU)) and may be mounted on any of various devices 1000. In this case, a dedicated hardware chip for artificial intelligence (AI) that is a dedicated processor for probability calculation has higher parallel processing performance than an existing general-purpose processor and thus may quickly perform a calculation operation in the field of AI such as machine learning.

In this case, the data learner 1310 and the data recognizer 1320 may be mounted on one device 1000, or may be separately mounted on devices 1000. For example, one of the data learner 1310 and the data recognizer 1320 may be included in the device 1000, and the remaining one may be included in the server 2000. Also, model information established by the data learner 1310 may be provided to the data recognizer 1320 and data input to the data recognizer 1320 may be provided as additional training data to the data learner 1310 by wire or wirelessly.

For example, the device 1000 may include the data recognizer 1320, and the server 2000 may include the data learner 1310. The server 2000 may learn a standard for grasping the intention of the user, and the device 1000 may determine the intention of the user based on a learning result by the server 2000.

The data learner 1310 of the server 2000 may learn a standard about which data is to be used to determine the intention of the user and how to determine the intention of the user by using the data. The data learner 1310 may learn a standard for grasping the intention of the user, by obtaining data to be used for learning and applying the obtained data to a data recognition model as described below.

However, this is merely an example, and the device 1000 may include the data learner 1310 and an external device such as the server 2000 may include the data recognizer 1320.

At least one of the data learner 1310 and the data recognizer 1320 may be implemented as a software module. When at least one of the data learner 1310 and the data recognizer 1320 is implemented as a software module (or a program module including instructions), the software module may be stored in a non-transitory computer-readable recording medium. Also, in this case, at least one software module may be provided by an operating system (OS) or a predetermined application. Alternatively, a part of at least one software module may be provided by an OS, and the remaining part may be provided by a predetermined application.

FIG. 21 is a block diagram of the data learner 1310 according to some embodiments.

Referring to FIG. 21, the data learner 1310 according to some embodiments may include a data obtainer 1310-1, a pre-processor 1310-2, a training data selector 1310-3, a model learner 1310-4, and a model evaluator 1310-5.

The data obtainer 1310-1 may obtain data needed to determine an intention of a user, provide association information, and recommend a substitute operation. The data obtainer 1310-1 may obtain data needed for learning for determining the intention of the user, providing the association information, and recommending the substitute operation.

The data obtainer 1310-1 may obtain, for example, predetermined voice of the user and predetermined context information.

The pre-processor 1310-2 may pre-process the obtained data so that the obtained data is used for learning for determining the intention of the user, providing the association information, and recommending the substitute operation. The pre-processor 1310-2 may process the obtained data into a preset format, so that the model learner 1310-4 uses the obtained data for learning for determining the intention of the user, providing the association information, and recommending the substitute operation.

The training data selector 1310-3 may select data needed for learning from among the pre-processed data. The selected data may be provided to the model learner 1310-4. The training data selector 1310-3 may select the data needed for learning from among the pre-processed data, according to a preset standard for determining the intention of the user, providing the association information, and recommending the substitute operation. Also, the training data selector 1310-3 may select the data according to a standard that is pre-set by learning by the model learner 1310-4 to be described below.

The model learner 1310-4 may learn a standard about how to determine the intention of the user, how to determine the association information, and how to recommend the substitute operation based on training data. Also, the model learner 1310-4 may learn a standard about which training data is to be used to determine the intention of the user, determine the association information, and recommend the substitute operation.

Also, the model learner 1310-4 may train a data recognition model used to determine the intention of the user, determine the association information, and recommend the substitute operation by using the training data. In this case, the data recognition model may be a model that is previously established. For example, the data recognition model may be a model that is previously established by receiving basic training data (e.g., sample data).

The data recognition model may be established in consideration of a field to which a recognition model is applied, the purpose of learning, or the computer performance of the device 1000. The data recognition model may be designed to simulate a human brain structure in a computer. The data recognition model may include a plurality of network nodes having a weight and simulating a neuron of a human neural network. The plurality of network nodes may form a connection relationship to simulate a synaptic activity in which a neuron transmits/receives a signal through a synapse. The data recognition model may include, for example, a neural network model or a deep learning model developed from the neural network model. In the deep learning model, the plurality of network nodes may be located at different depths (or layers) and may transmit/receive data according to a convolution connection relationship. For example, a model such as a deep neural network (DNN), a recurrent neural network (RNN), or a bidirectional recurrent deep neural network (BRDNN) may be used as the data recognition model.

According to various embodiments, when a plurality of data recognition models that are previously established exist, the model learner 1310-4 may determine a data recognition model having a high relationship with input training data and basic training data as a data recognition model to be trained. In this case, the basic training data may be previously classified according to types of data, and the data recognition models may be previously established according to types of data. For example, the basic training data may be previously classified according to various standards such as an area where training data is generated, a time for which the training data is generated, a size of the training data, a genre of the training data, a generator of the training data, and a type of an object in the training data.

Also, the model learner 1310-4 may train the data recognition model by using a learning algorithm including, for example, error back-propagation or gradient descent.

Also, the model learner 1310-4 may train the data recognition model, for example, through supervised learning by using training data as an input value. Also, the model learner 1310-4 may train the data recognition model through unsupervised learning to find a standard for determining the intention of the user, providing the association information, and recommending the substitute operation by learning a type of data needed to determine the intention of the user, provide the association information, and recommend the substitute operation by itself without supervision. Also, the model learner 1310-4 may train the data recognition model through reinforcement learning using a feedback about whether a result of determining the intention of the user, providing the association information, and recommending the substitute operation according to learning is right.

Also, when the data recognition model is trained, the model learner 1310-4 may store the trained data recognition model. In this case, the model learner 1310-4 may store the trained data recognition model in a memory of the device 1000 including the data recognizer 1320. Alternatively, the model learner 1310-4 may store the trained data recognition model in a memory of the server 2000 connected to the device 1000 through a wired or wireless network.

In this case, the memory in which the trained data recognition model is stored may also store, for example, a command or data related to at least another element of the device 1000. Also, the memory may store software and/or a program. The program may include, for example, a kernel, middleware, an application programming interface (API), and/or an application program (or an application).

When the model evaluator 1310-5 inputs evaluation data to the data recognition model and a recognition result output from the evaluation data does not satisfy a predetermined standard, the model evaluator 1310-5 may cause the model learner 1310-4 to learn again. In this case, the evaluation data may be preset data for evaluating the data recognition model.

For example, from among recognition results of the trained data recognition model output from evaluation data, when the number or a ratio of recognition results that are not accurate exceeds a preset threshold value, it may be evaluated that the predetermined standard is not satisfied. For example, when 2% is defined as the predetermined standard and wrong recognition results are output from more than 20 pieces of evaluation data from among 1000 pieces of evaluation data, the model evaluator 1310-5 may evaluate that the trained data recognition model is not suitable.

When a plurality of trained data recognition models exist, the model evaluator 1310-5 may evaluate whether each of the trained recognition models satisfies a predetermined standard, and may determine a model satisfying the predetermined standard as a final data recognition model. In this case, when a plurality of models satisfy the predetermined standard, the model evaluator 1310-5 may determine one or a predetermined number of models that are preset in a descending order of evaluation scores as final data recognition models.

At least one from among the data obtainer 1310-1, the pre-processor 1310-2, the training data selector 1310-3, the model learner 1310-4, and the model evaluator 1310-5 in the data learner 1310 may be manufactured as at least one hardware chip and may be mounted on the device 1000. For example, at least one of the model learner 1310-4, the pre-processor 1310-2, the training data selector 1310-3, the model learner 1310-4, and the model evaluator 1310-5 may be manufactured as a dedicated hardware chip for AI, or may be manufactured as a part of an existing general-purpose processor (e.g., a CPU or an application processor) or a graphics processor (e.g., a GPU) and may be mounted on any of various devices 1000.

Also, the data obtainer 1310-1, the pre-processor 1310-2, the training data selector 1310-3, the model learner 1310-4, and the model evaluator 1310-5 may be mounted on one device 1000, or may be separately respectively mounted on devices 1000. For example, some of the data obtainer 1310-1, the pre-processor 1310-2, the training data selector 1310-3, the model learner 1310-4, and the model evaluator 1310-5 may be included in the device 1000, and the remaining ones may be included in the server 2000.

Also, at least one of the data obtainer 1310-1, the pre-processor 1310-2, the training data selector 1310-3, the model learner 1310-4, and the model evaluator 1310-5 may be implemented as a software module. When at least one of the data obtainer 1310-1, the pre-processor 1310-2, the training data selector 1310-3, the model learner 1310-4, and the model evaluator 1310-5 is implemented as a software module (or a program module including instructions), the software module may be stored in a non-transitory computer-readable recording medium. Also, in this case, at least one software module may be provided by an OS or a predetermined application. Alternatively, a part of at least one software module may be provided by an OS, and the remaining part may be provided by a predetermined application.

The processor 1300 may use various data recognition models, and may efficiently learn a standard for determining the intention of the user, providing the association information, and recommending the substitute operation by using various methods through the data recognition models.

Figure 30:
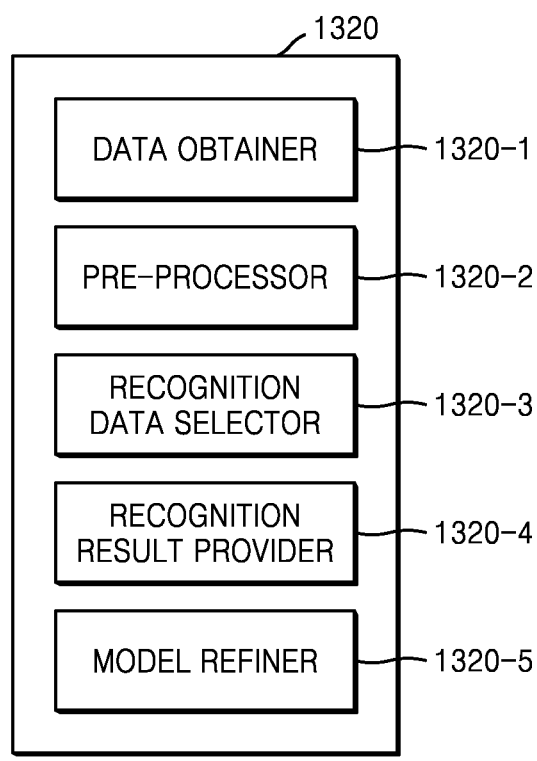
FIG. 30 is a block diagram of a data recognizer 1320 according to some embodiments.

FIG. 30 is a block diagram of the data recognizer 1320 according to some embodiments.

Referring to FIG. 30, the data recognizer 1320 according to some embodiments may include a data obtainer 1320-1, a pre-processor 1320-2, a recognition data selector 1320-3, a recognition result provider 1320-4, and a model refiner 1320-5.

The data obtainer 1320-1 may obtain data needed to determine an intention of a user, provide association information, and recommend a substitute operation, and the pre-processor 1320-2 may pre-process the obtained data so that the obtained data is used to determine the intention of the user, provide the association information, and recommend the substitute operation. The pre-processor 1320-2 may process the obtained data into a preset format, so that the recognition result provider 1320-4 uses the obtained data to determine the intention of the user, provide the association information, and recommend the substitute operation. For example, the data obtainer 1320-1 may obtain voice of the user input to the device 1000. Also, the data obtainer 1320-1 may obtain context information related to the device 1000 or the user. The context information may include at least one of, but not limited to, ambient environment information of the device 1000, state information of the device 1000, state information of the user, device usage history information of the user, and schedule information of the user. Also, for example, the context information may be information generated by the device 1000 or information received from an external device.

The recognition data selector 1320-3 may select data needed to determine the intention of the user, provide the association information, and recommend the substitute operation from among the pre-processed data. The selected data may be provided to the recognition result provider 1320-4. The recognition data selector 1320-3 may select some or all of the pre-processed data, according to a preset standard for determining the intention of the user, providing the association information, and recommending the substitute operation. Also, the recognition data selector 1320-3 may select data according to a standard that is pre-set by learning by the model learner 1310-4.

The recognition result provider 1320-4 may determine the intention of the user, provide the association information, and recommend the substitute operation by applying the selected data to a data recognition model. The recognition result provider 1320-4 may provide a recognition result according to the purpose of data recognition. The recognition result provider 1320-4 may apply the selected data to the data recognition model, by using the data selected by the recognition data selector 1320-3 as an input value. Also, the recognition result may be determined by the data recognition model.

The model refiner 1320-5 may refine the data recognition model based on evaluation of the recognition result provided by the recognition result provider 1320-4. For example, the model refiner 1320-5 may provide the recognition result provided by the recognition result provider 1320-4 to the model learner 1310-4 so that the model learner 1310-4 refines the data recognition model.

At least one of the data obtainer 1320-1, the pre-processor 1320-2, the recognition data selector 1320-3, the recognition result provider 1320-4, and the model refiner 1320-5 in the data recognizer 1320 may be manufactured as at least one hardware chip and may be mounted on the device 1000. For example, at least one of the data obtainer 1320-1, the pre-processor 1320-2, the recognition data selector 1320-3, the recognition result provider 1320-4, and the model refiner 1320-5 may be manufactured as a dedicated hardware chip for AI, or may be manufactured as a part of an existing general-purpose processor (e.g., a CPU or an application processor) or a graphics processor (e.g., a GPU) and may be mounted on any of various devices 1000.

Also, the data obtainer 1320-1, the pre-processor 1320-2, the recognition data selector 1320-3, the recognition result provider 1320-4, and the model refiner 1320-5 may be mounted on one device 1000, or may be separately respectively mounted on devices 1000. For example, some of the data obtainer 1320-1, the pre-processor 1320-2, the recognition data selector 1320-3, the recognition result provider 1320-4, and the model refiner 1320-5 may be included in the device 1000, and the remaining others may be included in the server 2000.

Also, at least one of the data obtainer 1320-1, the pre-processor 1320-2, the recognition data selector 1320-3, the recognition result provider 1320-4, and the model refiner 1320-5 may be implemented as a software module. When at least one of the data obtainer 1320-1, the pre-processor 1320-2, the recognition data selector 1320-3, the recognition result provider 1320-4, and the model refiner 1320-5 is implemented as a software module (or a program module including instructions), the software module may be stored in a non-transitory computer-readable recording medium. Also, in this case, at least one software module may be provided by an OS or a predetermined application. Alternatively, a part of at least one software module may be provided by an OS and the remaining part may be provided by a predetermined application.

Also, the device 1000 may provide a service that meets the intention of the user to the user by using the data recognition model to which a learning result is applied.

Figure 31:
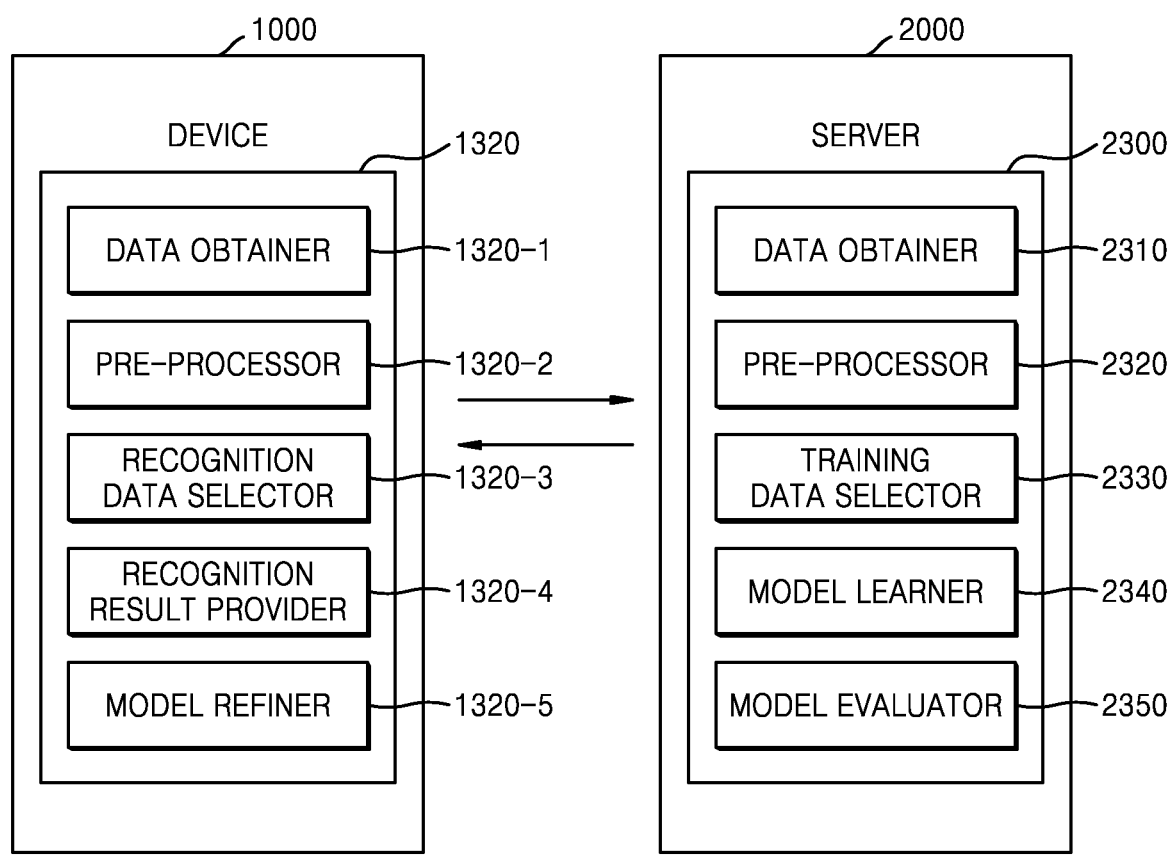
FIG. 31 is a view illustrating an example where the device 1000 and the server 2000 interoperate to learn and recognize data, according to some embodiments.

FIG. 31 is a block diagram illustrating an example where the device 1000 and the server 2000 interoperate to learn and recognize data according to some embodiments.

Referring to FIG. 31, the server 2000 may learn a standard for determining an intention of a user, providing association information, and recommending a substitute operation, and the device 1000 may determine the intention of the user, provide the association information, and recommend the substitute operation based on a learning result of the server 2000.

Figure 29:
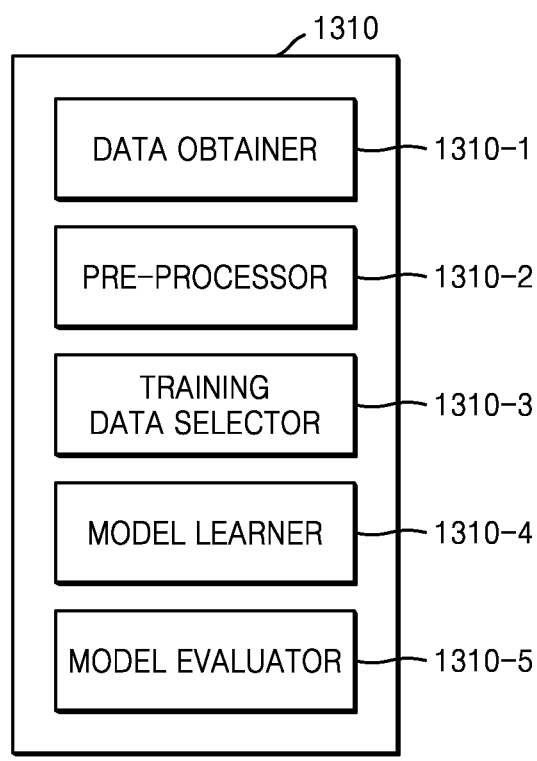
FIG. 29 is a block diagram of a data learner 1310 according to some embodiments.

In this case, a model learner 2340 of the server 2000 may perform a function of the data learner 1310 of FIG. 29. The model learner 2340 of the server 2000 may learn a standard about which data is to be used to determine the intention of the user, provide the association information, and recommend the substitute operation. Also, the model learner 2340 of the server 2000 may learn a standard about how to determine the intention of the user, provide the association information, and recommend the substitute operation by using the data. The model learner 2340 may learn a standard for determining the intention of the user, providing the association information, and recommending the substitute operation, by obtaining data to be used for learning and applying the obtained data to a data recognition model as described below.

Also, the recognition result provider 1320-4 of the device 1000 may determine the intention of the user, provide the association information, and recommend the substitute operation by applying data selected by the recognition data selector 1320-3 to the data recognition model generated by the server 2000. For example, the recognition result provider 1320-4 may transmit the data selected by the recognition data selector 1320-3 to the server 2000, and the server 2000 may request to determine the intention of the user, provide the association information, and recommend the substitute operation by applying the data selected by the recognition data selector 1320-3 to a recognition model. Also, the recognition result provider 1320-4 may receive information about how to determine the intention of the user, provide the association information, and recommend the substitute operation determined by the server 2000 from the server 2000.

Alternatively, the recognition result provider 1320-4 of the device 1000 may receive the recognition model generated by the server 2000 from the server 2000, and may determine the intention of the user, provide the association information, and recommend the substitute operation by using the received recognition model. In this case, the recognition result provider 1320-4 of the device 1000 may determine the intention of the user, provide the association information, and recommend the substitute operation by applying the data selected by the recognition data selector 1320-3 to the data recognition model received from the server 2000.

Also, the device 1000 and the server 2000 may effectively perform works for learning and data recognition of the data recognition model through division of roles. Accordingly, data processing may be efficiently performed to provide a service that meets the intention of the user and the user's privacy may be effectively protected.

Some embodiments may be implemented as a software program including instructions stored in a computer-readable storage medium.

A computer which is an apparatus capable of calling stored instructions from a storage medium and performing operations according to an embodiment according to the called instructions may include a device or an external server connected to and communicating with the device according to disclosed embodiments.

The computer-readable storage medium may be provided as a non-transitory storage medium. Here, 'non-transitory' means that the storage medium does not include a signal or current and is tangible, but does not distinguish whether data is stored semi-permanently or temporarily in the storage medium. Examples of the non-transitory storage medium may include a non-transitory readable storage medium such as a compact disc (CD), a digital versatile disc (DVD), a hard disk, a blue-ray disc, a universal serial bus (USB), an internal memory, a memory card, a read-only memory (ROM), or a random-access memory (RAM) and a medium capable of temporarily storing data such as a register, a cache, or a buffer.

In addition, a method according to disclosed embodiments may be provided as a computer program product.

The computer program product may include a software program, a computer-readable storage medium storing a software program, or a product traded between a seller and a purchaser.

For example, the computer program product may include a product (e.g., a downloadable application) that is electronically distributed as a software program through an electronic market (e.g., Google Play Store or AppStore) or a manufacturer of a device. For electronic distribution, at least a part of the software program may be stored in a storage medium or may be temporarily generated. In this case, the storage medium may be a server of the manufacturer, a server of the electronic market, or a storage medium of a relay server.

Also, the term "unit" used herein may be a hardware component such as a processor a circuit and/or a software component executed in a hardware component such as a processor.

While the present invention has been particularly shown and described with reference to embodiments thereof, it will be understood by one of ordinary skill in the art that various changes in form and details may be made therein without departing from the spirit and scope of the present invention as defined by the following claims. Hence, it will be understood that the embodiments described above are not limiting of the scope of the present invention. For example, each component described in a single type may be executed in a distributed manner, and components described distributed may also be executed in an integrated form.

The scope of the present invention is indicated by the claims rather than by the detailed description, and it should be understood that the claims and all modifications or modified forms drawn from the concept of the claims are included in the scope of the present invention.

The invention claimed is:

1. A device comprising:
a memory storing at least one program;
a microphone configured to receive a voice input of a user; and
at least one processor configured to provide a response message to the voice input of the user by executing the at least one program,
wherein the at least one program comprises instructions for:
obtaining an original destination provided in the voice input of the user;
determining an intention of the user, by analyzing the received voice input;
obtaining association information related to the original destination;
generating the response message that recommends a substitute destination replacing the original destination and related to the intention of the user, based on the obtained association information; and
displaying the generated response message,
wherein the generating of the response message that recommends the substitute destination further comprises:
determining feasibility of the determined intention, based on the obtained association information; and
determining whether to recommend the substitute destination, based on the feasibility.

2. The device of claim 1, wherein the determining of the intention of the user further comprises:
determining a category of the intention of the user; and
determining a task type of the determined category.

3. The device of claim 2, wherein the generating of the response message that recommends the substitute destination comprises generating the response message that recommends the substitute destination related to the intention of the user, based on the determined feasibility, the determined category, and the determined task type.

4. The device of claim 2, wherein the obtaining of the association information comprises obtaining the association information that is related to the original destination and is set by learning to determine the feasibility of the intention of the user, based on the determined category and the determined task type.

5. The device of claim 1, wherein the determining of the intention of the user comprises determining the intention of the user, based on the analyzed voice input and schedule information of the user.

6. The device of claim 2, wherein the at least one program further comprises instructions for:
obtaining additional information related to the intention of the user, based on the determined category and the determined task type; and providing the additional information along with the response message.

7. The device of claim 1, wherein the at least one program further comprises instructions for executing a preset application for performing an operation included in the response message, based on a user input with respect to the response message.

8. The device of claim 7, wherein the at least one program further comprises instructions for inputting a preset input value to the executed application, based on the intention of the user and the response message.

9. A method, performed by a device, of providing a response message to a voice input of a user, the method comprising:
receiving the voice input of the user;
obtaining an original destination provided in the voice input of the user;
determining an intention of the user, by analyzing the received voice input;
obtaining association information related to the original destination;
generating the response message that recommends a substitute destination replacing the original destination and related to the intention of the user, based on the obtained association information; and
displaying the generated response message,
wherein the generating of the response message that recommends the substitute destination further comprises:
determining feasibility of the determined intention, based on the obtained association information; and
determining whether to recommend the substitute destination, based on the feasibility.

10. The method of claim 9, wherein the determining of the intention of the user further comprises:
determining a category of the intention of the user; and
determining a task type of the determined category.

11. The method of claim 10, wherein the generating of the response message that recommends the substitute destination comprises generating the response message that recommends the substitute destination related to the intention of the user, based on the determined feasibility, the determined category, and the determined task type.

12. A non-transitory computer-readable recording medium having embodied thereon a program for executing the method of claim 9 in a computer.

13. A device comprising:
a memory storing at least one program;
a microphone configured to receive a voice input of a user; and
at least one processor configured to provide a response message to the voice input of the user by executing the at least one program,
wherein the at least one program comprises instructions for:
obtaining an original destination provided in the voice input of the user;
determining an intention of the user, by analyzing the received voice input;
in response to obtaining the original destination, obtaining association information related to the original destination;
generating the response message that recommends a substitute destination replacing the original destination and related to the intention of the user, based on the obtained association information;
displaying the generated response message on a screen of the device; and
based on receiving a user input for the substitute destination, executing an application for guiding a route to the substitute destination, the application being installed in the device.

14. The device of claim 13, wherein the association information comprises information about at least one of business hours of the original destination, a parking situation of the original destination, and traffic conditions to the original destination.

15. The method of claim 10, wherein the obtaining of the association information comprises obtaining the association information that is related to the original destination and is set by learning to determine the feasibility of the intention of the user, based on the determined category and the determined task type.

16. The device of claim 13, wherein the determining of the intention of the user further comprises:
determining a category of the intention of the user; and
determining a task type of the determined category.

17. The device of claim 16, wherein the obtaining of the association information comprises obtaining the association information that is related to the original destination and is set by learning to determine feasibility of the intention of the user, based on the determined category and the determined task type.

18. The device of claim 1, wherein the obtaining of the association information includes obtaining the association information related to the original destination based on a category of the intention of the user and a task type of the category.

19. The method of claim 9, wherein the obtaining of the association information includes obtaining the association information related to the original destination based on a category of the intention of the user and a task type of the category.

20. The device of claim 13, wherein the obtaining of the association information includes obtaining the association information related to the original destination based on a category of the intention of the user and a task type of the category.

* * * * *